(12) United States Patent
Choi et al.

(10) Patent No.: US 11,496,806 B2
(45) Date of Patent: Nov. 8, 2022

(54) CONTENT PROVIDING SERVER, CONTENT PROVIDING TERMINAL, AND CONTENT PROVIDING METHOD

(71) Applicant: NAVER CORPORATION, Seongnam-si (KR)

(72) Inventors: Byung Gyou Choi, Seongnam-si (KR); Sung Hyun Lee, Seongnam-si (KR); Sang Yoon Lee, Seongnam-si (KR); Jun Oh Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 17/236,494

(22) Filed: Apr. 21, 2021

(65) Prior Publication Data

US 2021/0243502 A1 Aug. 5, 2021

Related U.S. Application Data

(63) Continuation of application No. PCT/KR2019/013138, filed on Oct. 7, 2019.

(30) Foreign Application Priority Data

Oct. 24, 2018 (KR) .................. 10-2018-0127336

(51) Int. Cl.
*H04N 21/472* (2011.01)
*H04N 21/2743* (2011.01)
(Continued)

(52) U.S. Cl.
CPC ... *H04N 21/47217* (2013.01); *H04N 21/2743* (2013.01); *H04N 21/42203* (2013.01);
(Continued)

(58) Field of Classification Search
CPC ......... H04N 21/47217; H04N 21/2743; H04N 21/42203; H04N 21/435; H04N 21/4394;
(Continued)

(56) References Cited

U.S. PATENT DOCUMENTS

2008/0288890 A1* 11/2008 Anderson .......... H04N 21/2743
715/810
2012/0036431 A1 2/2012 Ito et al.
(Continued)

FOREIGN PATENT DOCUMENTS

KR 1020090131228 A 12/2009
KR 1020120005000 A 1/2012
(Continued)

OTHER PUBLICATIONS

Notice of allowance issued in Korean application No. 10-2018-0131848, dated Jun. 8, 2020.
(Continued)

*Primary Examiner* — Alazar Tilahun
(74) *Attorney, Agent, or Firm* — Greer Burns & Crain, Ltd.

(57) ABSTRACT

A method for operating a user terminal providing a video slide service includes uploading a UGC video to a server; receiving, from the server, scene metadata information for each reproduction section corresponding to the UGC video; generating a video slide file based on the scene metadata information for each reproduction section; displaying an item corresponding to the video slide file; and displaying a page screen composed of representative image information and subtitle information, for each reproduction section of the UGC video in response to a user selection on the item.

26 Claims, 21 Drawing Sheets

(51) Int. Cl.
  *H04N 21/435* (2011.01)
  *H04N 21/488* (2011.01)
  *H04N 21/439* (2011.01)
  *H04N 21/4788* (2011.01)
  *H04N 21/422* (2011.01)

(52) U.S. Cl.
  CPC ....... *H04N 21/435* (2013.01); *H04N 21/4394* (2013.01); *H04N 21/4788* (2013.01); *H04N 21/4884* (2013.01)

(58) Field of Classification Search
  CPC ........... H04N 21/4788; H04N 21/4884; H04N 21/431; H04N 21/439; H04N 21/472; H04N 21/488; H04N 21/8549; H04N 21/4312; G06Q 50/10
  See application file for complete search history.

(56) References Cited

U.S. PATENT DOCUMENTS

| | | | | |
|---|---|---|---|---|
| 2015/0019969 A1* | 1/2015 | Lee | ....................... | G06F 16/685 |
| | | | | 715/719 |
| 2017/0083148 A1* | 3/2017 | Ahn | ...................... | G06F 3/1446 |
| 2017/0134605 A1* | 5/2017 | Ju | .................... | H04N 5/232935 |
| 2017/0206929 A1* | 7/2017 | Jo | ............................ | H04N 5/93 |
| 2017/0330598 A1 | 11/2017 | Choi et al. | | |
| 2018/0211556 A1* | 7/2018 | Sreedhara | ................ | G09B 5/06 |

FOREIGN PATENT DOCUMENTS

| | | |
|---|---|---|
| KR | 1020150009053 A | 1/2015 |
| KR | 1020150122673 A | 11/2015 |
| KR | 1020160044981 A | 4/2016 |
| KR | 1020160072511 A | 6/2016 |
| KR | 1020160135151 A | 11/2016 |
| KR | 1020170087307 A | 7/2017 |
| KR | 101769071 B1 | 8/2017 |
| WO | 2014134801 A1 | 9/2014 |

OTHER PUBLICATIONS

Office action issued in Korean application No. 10-2018-0131848, dated Oct. 22, 2019.
Office action issued in Korean application No. 10-2018-0127336, dated Apr. 6, 2020.
Office action issued in Korean application No. 10-2018-0127336, dated Jul. 25, 2019.
Choi et al.; U.S. Appl. No. 17/236,512, filed Apr. 21, 2021.

* cited by examiner

FIG. 5

| ID (510) | TIME CODE (520) | REPRESENTATIVE IMAGE (530) | SOUND (540) | SUBTITLE (550) | IMAGE TAG (560) |

<CONFIGURATION OF SCENE META-INFORMATION FRAME>

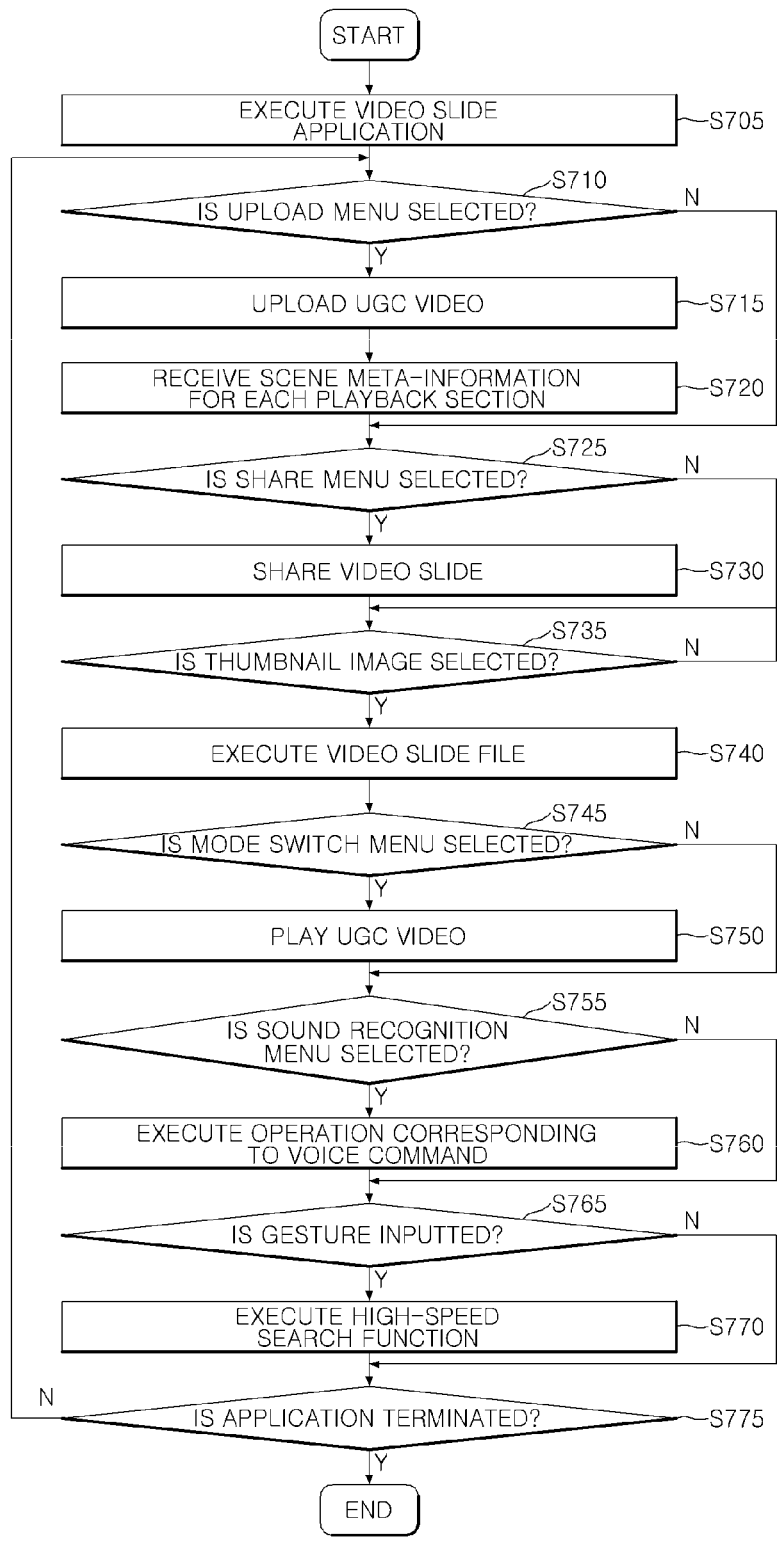

CONTENT PROVIDING SERVER, CONTENT PROVIDING TERMINAL, AND CONTENT PROVIDING METHOD

CROSS-REFERENCE TO RELATED APPLICATIONS

This application is a continuation of PCT Application No. PCT/KR2019/013138 filed on 7 Oct. 2019, which claims priority of Korean Patent Application No. 10-2018-0127336 filed on 24 Oct. 2018 in Korean Intellectual Property Office, the entire contents of which are hereby incorporated by reference in their entirety.

BACKGROUND OF THE INVENTION

Field of the Invention

The disclosure relates to a content providing server, a content providing terminal, and a content providing method, and more particularly, to a content providing server, a content providing terminal, and a content providing method for providing a video slide service using information extracted from user-generated content (UGC).

Description of Related Art

Due to the development of information and communication technology and popular culture, various types of video content are being produced and spreading all over the world. In the case of video content, unlike a book, a viewer cannot arbitrarily control the pace of a video in progress and is thus compelled to watch the video regardless of whether the viewer understands the video. Therefore, to solve this problem, various methods for controlling the playback time of a video or for searching for a video are proposed.

As a representative method for controlling the playback time of a video, control using a progress bar is employed. According to this method, when a viewer selects an arbitrary point on the progress bar, the playback time of a video is moved to the selected point.

The progress bar has a constant length regardless of the playback time of a video. Thus, when a video has a long playback time, even a small movement on the progress bar causes a significant change in the playback time of the video, making it difficult to finely control the playback time. In particular, when watching a video in a mobile environment, it is more difficult to control the playback time of the video because a display has a small size and it is often necessary to control the progress bar with a finger.

Further, when a user tries to understand the content of a video in an environment with limited communication speed, if the video is high-capacity or high-quality, the video cannot be smoothly provided from the server to a content providing terminal, making it difficult to watch all scenes of the video in real time. Therefore, there is a need for a new video service that enables a viewer to watch video content by turning over pages like a book.

BRIEF SUMMARY OF THE INVENTION

The disclosure has been made to address the above-mentioned problems and other problems. An aspect of the disclosure is to provide a content providing server, a content providing terminal, and a content providing method for generating scene meta-information for each playback section based on information extracted from user-generated content (UGC).

Another aspect is to provide a content providing server, a content providing terminal, and a content providing method for providing a video slide service based on scene meta-information for each playback section about user-generated content (UGC).

In view of the foregoing or other aspects, an embodiment of the disclosure provides an operating method of a user terminal including: uploading a user-generated content (UGC) video to a server; receiving scene meta-information for each playback section corresponding to the UGC video from the server; generating a video slide file based on the received scene meta-information for each playback section; displaying an item corresponding to the video slide file; and displaying a page screen including representative image information and subtitle information for each playback section of the UGC video in response to a user selection on the item.

Another embodiment of the disclosure provides a user terminal including: a communication unit configured to provide a communication interface with a server; a display unit configured to display a predefined user interface; and a controller configured to upload a user-generated content (UGC) video to the server using an upload menu included in the user interface, to generate a video slide file based on scene meta-information for each playback section about the UGC video when receiving the scene meta-information for each playback section from the server, to display an item corresponding to the video slide file, and to display a page screen including representative image information and subtitle information for each playback section of the UGC video when the item is selected.

Still another embodiment of the disclosure provides a computer program recorded in a computer-readable storage medium to perform, on a computer, a process of uploading a user-generated content (UGC) video to a server, a process of receiving scene meta-information for each playback section corresponding to the UGC video from the server, a process of generating a video slide file based on the received scene meta-information for each playback section, a process of displaying an item corresponding to the video slide file, and a process of displaying a page screen including representative image information and subtitle information for each playback section of the UGC video in response to a user selection on the item.

BRIEF DESCRIPTION OF THE DRAWINGS

FIG. 5 illustrates the configuration of a scene meta-information frame according to an embodiment of the disclosure;

FIG. 7 is a flowchart illustrating the operation of a user terminal according to an embodiment of the disclosure;

DETAILED DESCRIPTION OF THE INVENTION

Figure 1:
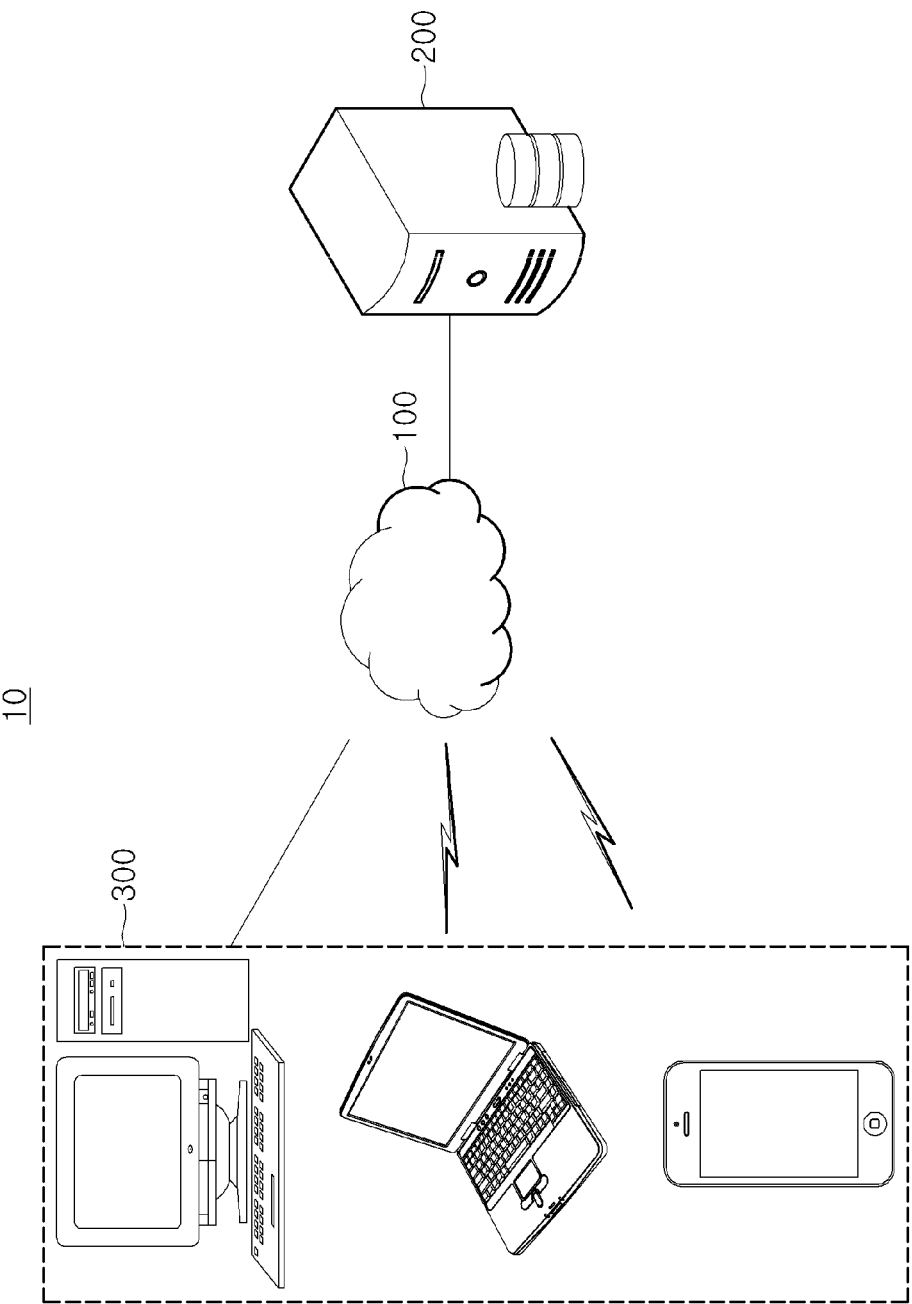
FIG. 1 illustrates the configuration of a content providing system according to an embodiment of the disclosure.

Hereinafter, embodiments disclosed herein will be described in detail with reference to the accompanying drawings, in which like or similar elements are denoted by like reference numerals regardless of drawing numerals and redundant descriptions thereof will be omitted. The term 'unit' used herein refers to software or a hardware component, such as FPGA or ASIC, and a 'unit' performs certain functions. However, a 'unit' is not limited to software or hardware. A 'unit' may be configured to be in an addressable storage medium or may be configured to provide instructions to one or more processors. Thus, in one example, a 'unit' includes components, such as software components, object-oriented software components, class components, and task components, processes, functions, properties, procedures, subroutines, segments of a program code, drivers, firmware, a microcode, circuitry, data, a database, data structures, tables, arrays, and variables. Functions provided in components and 'units' may be combined into a smaller number of components and 'units' or may be further divided into additional components and 'units.'

When detailed descriptions about related known technology are determined to make the gist of embodiments disclosed herein unclear in describing the embodiments disclosed herein, the detailed descriptions will be omitted herein. In addition, it should be understood that the accompanying drawings are only for easy understanding of the embodiments disclosed herein, and technical ideas disclosed herein are not limited by the accompanying drawings but include all modifications, equivalents, or substitutes included in the spirit and technical scope of the disclosure.

The disclosure proposes a content providing server, a content providing terminal, and a content providing method for generating scene meta-information for each playback section based on information extracted from user-generated content (UGC). In addition, the disclosure proposes a content providing server, a content providing terminal, and a content providing method for providing a video slide service using scene meta-information for each playback section about user-generated content (UGC).

As described herein, user-generated content (UGC) is video content produced by a terminal user and refers to a moving image including one or more image frames and audio frames. In some cases, the user-generated content may include a subtitle file (or subtitle information).

A video slide service refers to a video service that enables a viewer (user) to quickly and easily understand the content of a video by turning over the pages of the video like a book.

Scene meta-information is information for identifying scenes forming video content (i.e., a moving image) and includes at least one of a time code, representative image information, subtitle information, and sound information. The time code is information about a subtitle section or a sound section of the video content, the representative image information is information about a representative image of the subtitle or the sound section, the sound information is unit sound information corresponding to the subtitle or the sound section, and the subtitle information is unit subtitle information corresponding to the subtitle or the sound section.

The sound section is information about a time section in which a unit sound is output in the playback section of the video content and may include 'sound start time information' about a playback time point of the video content at which output of each unit sound starts, 'sound end time information' about a playback time point of the video content at which output of each unit sound ends, and 'sound output time information' about time in which output of each unit sound is maintained. Alternatively, the sound section may include only the 'sound start time information' and the 'sound end time information'.

The subtitle section is information about a section in which a unit subtitle is displayed in the playback section of the video content and may include 'subtitle start time information' about a playback time point of the video content at which display of each unit subtitle starts, 'subtitle end time information' about a playback time point of the video content at which display of each unit subtitle ends, and 'subtitle display time information' about time in which display of each unit subtitle is maintained. Alternatively, the subtitle section may include only the 'subtitle start time information' and the 'subtitle end time information'.

Hereinafter, various embodiments of the disclosure will be described in detail with reference to the attached drawings.

FIG. 1 illustrates the configuration of a content providing system according to an embodiment of the disclosure.

Referring to FIG. 1, the content-providing system 10 according to the disclosure may include a communication network 100, a server 200, and a user terminal 300.

The server 200 and the user terminal 300 may be connected to each other through the communication network 100. The communication network 100 may include a wired network and a wireless network and may specifically include various networks, such as a local area network (LAN), a metropolitan area network (MAN), and a wide area network (WAN). The communication network 100 may also include the known World Wide Web (WWW). However, the communication network 100 according to the disclosure is not limited to the listed networks but may include at least one of a known wireless data network, a known telephone network, and a known wired/wireless television network.

The server 200 may be a service providing server or a content providing server and may perform a function of providing a communication service requested by the user terminal 300. For example, when the server 200 is a web server, the server 200 may construct content requested by the user terminal 300 in the form of a web page and may provide the content to the terminal 300. In another example, when the server 200 is a multimedia providing server, the server 200 may construct multimedia content requested by the user terminal 300 in the form of a transmission file and may provide the multimedia content to the terminal 300.

The server 200 may generate scene meta-information for each playback section including at least one of a time code, representative image information, subtitle information, and sound information based on video content stored in a database or video content uploaded from the user terminal 300 and may provide the scene meta-information about the video content to the user terminal 300. Here, a playback section for generating scene meta-information may be a subtitle section or a sound section. Therefore, 'scene meta-information for each playback section' may be referred to as 'scene meta-information for each subtitle section' or 'scene meta-information for each sound section'.

The server 200 may provide a video slide service to the user terminal 300 using the scene meta-information about the video content. To this end, the server 200 may generate a plurality of pieces of page information based on the scene meta-information for each playback section of the video content (i.e., the time code, the representative image information, the subtitle information, and the sound information). Here, the page information (or video slide information) is information for providing the video slide service and is information in which at least one of representative image information, unit subtitle information, and unit sound information is constructed in the form of a page. In addition, the server 200 may generate a video slide file including the plurality of pieces of page information and may provide the video slide file to the user terminal 300.

The user terminal 300 may provide a communication service based on information provided from the server 200. For example, when the server 200 is a web server, the user terminal 300 may provide a web service based on content provided from the server 200. In another example, when the server 200 is a multimedia providing server, the user terminal 300 may provide a multimedia service based on content provided from the server 200.

The user terminal 300 may download and install an application for playing video content and/or providing an additional service (e.g., a video slide service) associated with video content. Here, the user terminal 300 may access an App Store, a Play Store, or the like to download the application or may download the application through a separate storage medium. In addition, the user terminal 300 may download the application through wired/wireless communication with the server 200 or a different device.

The user terminal 300 may upload video content (e.g., a UGC video) to the server 200 according to a user command or the like. The user terminal 300 may receive at least one of video content, scene meta-information for each playback section of the video content, and a video slide file including pieces of page information corresponding to the scene meta-information from the server 200.

The user terminal 300 may generate a plurality of pieces of page information based on scene meta-information about video content received from the server 200 or scene meta-information about video content stored in a memory. In addition, the user terminal 300 may generate scene meta-information for each playback section based on video content received from the server 200 or video content stored in the memory and may generate a plurality of pieces of page information using the scene meta-information.

The user terminal 300 may provide a video playback service based on video content received from the server 200 or stored in the memory. In addition, the user terminal 300 may provide a video slide service based on scene meta-information for each playback section about video content.

The user terminal 300 described herein may include a mobile phone, a smartphone, a laptop computer, a desktop computer, a digital broadcasting device, a personal digital assistant (PDA), a portable multimedia player (PMP), a slate PC, a tablet PC, an Ultrabook, a wearable device (e.g., a smartwatch, smart glasses, and a head-mounted display (HMD)), or the like.

Although this embodiment shows that the user terminal 300 interworks with the server 200 to provide a video slide service, the disclosure is not necessarily limited thereto. Instead, it will be apparent to those skilled in the art that the user terminal 300 can independently provide video slide services without interworking with the server 200.

Figure 2:
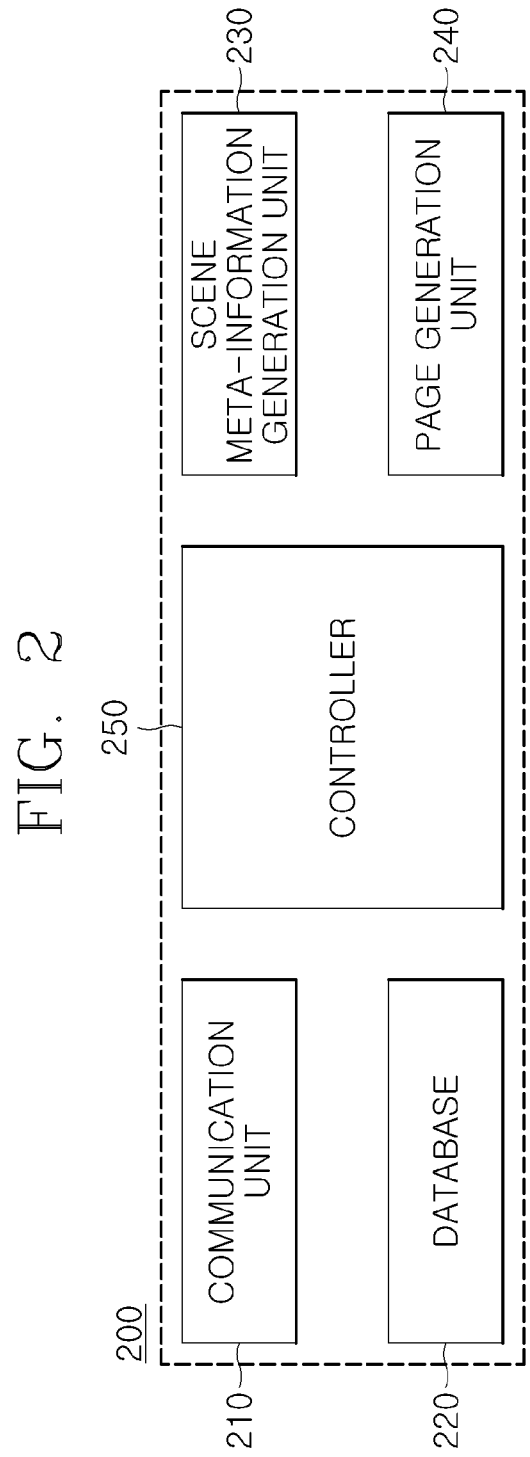
FIG. 2 is a block diagram illustrating the configuration of a server according to an embodiment of the disclosure.

FIG. 2 is a block diagram illustrating the configuration of the server 200 according to an embodiment of the disclosure.

Referring to FIG. 2, the server 200 according to the disclosure may include a communication unit 210, a database 220, a scene meta-information generation unit 230, a page generation unit 240, and a controller 250. The components illustrated in FIG. 2 are not necessarily essential to configure the server 200, and the server described herein may have more or fewer components than the components listed above.

The communication unit 210 may include a wired communication module for supporting wired communication and a wireless communication module for supporting wireless communication. The wired communication module may transmit or receive a wired signal to or from at least one of a different server, a base station, and an access point (AP) via a wired communication network established according to technical standards or communication modes for wired communication (e.g., Ethernet, power-line communication (PLC), Home PNA, IEEE 1394, and the like). The wireless communication module may transmit or receive a wireless signal to or from at least one of a base station, an access point, and a relay via a wireless communication network established according to technical standards or communication modes for wireless communication (e.g., a wireless LAN (WLAN), wireless fidelity (Wi-Fi), Digital Living Network Alliance (DLNA), Global System For Mobile Communications (GSM), code-division multiple access (CDMA), wideband CDMA (WCDMA), Long-Term Evolution (LTE), LTE-Advanced (LTE-A), and the like).

In this embodiment, the communication unit 210 may transmit video content, scene meta-information for each playback section of the video content, a video slide file including pieces of page information corresponding to the scene meta-information, or the like stored in the database 220 to a user terminal 300. Further, the communication unit 210 may receive video content uploaded by the user terminal 300, information about a video slide service requested by the user terminal 300, or the like.

The database 220 may function to store information (or data) received from the user terminal 300 or a different server (not shown), information (or data) autonomously generated by the server 200, information (or data) to be transmitted to the user terminal 300 or a different server, or the like. In this embodiment, the database 200 may store a plurality of pieces of video content, scene meta-information for each playback section about the plurality of pieces of video content, a video slide file including pieces of page information corresponding to the scene meta-information, or the like.

The scene meta-information generation unit 230 may generate scene meta-information for each playback section including at least one of a time code, representative image information, subtitle information, and sound information based on video content stored in the database 220 or video content uploaded from the user terminal 300. To this end, the scene meta-information generation unit 230 may extract a plurality of sound sections based on audio information extracted from the video content and may generate sound information and subtitle information corresponding to each sound section through sound recognition of audio information about each sound section. Further, the scene meta-information generation unit 230 may extract a plurality of sound sections based on audio information extracted from the video content and may generate representative image information about each sound section through sound recognition of audio information about each sound section and image recognition of image information about each sound section.

Representative image information is image information representing a subtitle or a sound section of video content and may include at least one of successive image frames of the video content played within the subtitle or the sound section. Specifically, the representative image information may be an image frame arbitrarily selected from among the image frames within the subtitle or the sound section or an image frame (e.g., the foremost image frame in the subtitle or the sound section, the middle image frame, the last image frame, an image frame most similar to subtitle information, or the like) selected from among the image frames according to a predetermined rule.

The page generation unit 240 may generate a plurality of pieces of page information based on scene meta-information for each playback section about video content. That is, the page generation unit 240 may generate page information using at least one of representative image information, subtitle information, and sound information. In addition, the page generation unit 240 may generate a video slide file including a plurality of pieces of page information corresponding to scene meta-information for each playback section. When the user terminal 300 generates page information corresponding to scene meta-information for each playback section instead of the server 200, the page generation unit 240 may be configured to be omitted.

The controller 250 controls the overall operation of the server 200. The controller 250 may control a combination of at least one of the foregoing components in order to implement various embodiments to be described below on the server 200 according to the disclosure.

In this embodiment, the controller 250 may provide a communication service requested by the user terminal 300. For example, the controller 250 may provide a video playback service or a video slide service to the user terminal 300. To this end, the controller 250 may provide video content stored in the database 220 to the user terminal 300. Further, the controller 250 may generate scene meta-information for each playback section based on information extracted from video content and provide the scene meta-information for each playback section to the user terminal 300. In addition, the controller 250 may generate a video slide file including on a plurality of pieces of page information based on scene meta-information for each playback section about video content and provide the video slide file to the user terminal 300.

The control unit 250 may be a processor or multiple processors. When the control unit 250 is a processor, the processor may comprise the scene meta information generating unit 230 and the page generating unit 240. Although it is not shown in drawings, the processor may comprise functional units (i.e., means) for performing S615, S620, S625, S635, S640, and S645 steps of FIG. 6.

Figure 3:
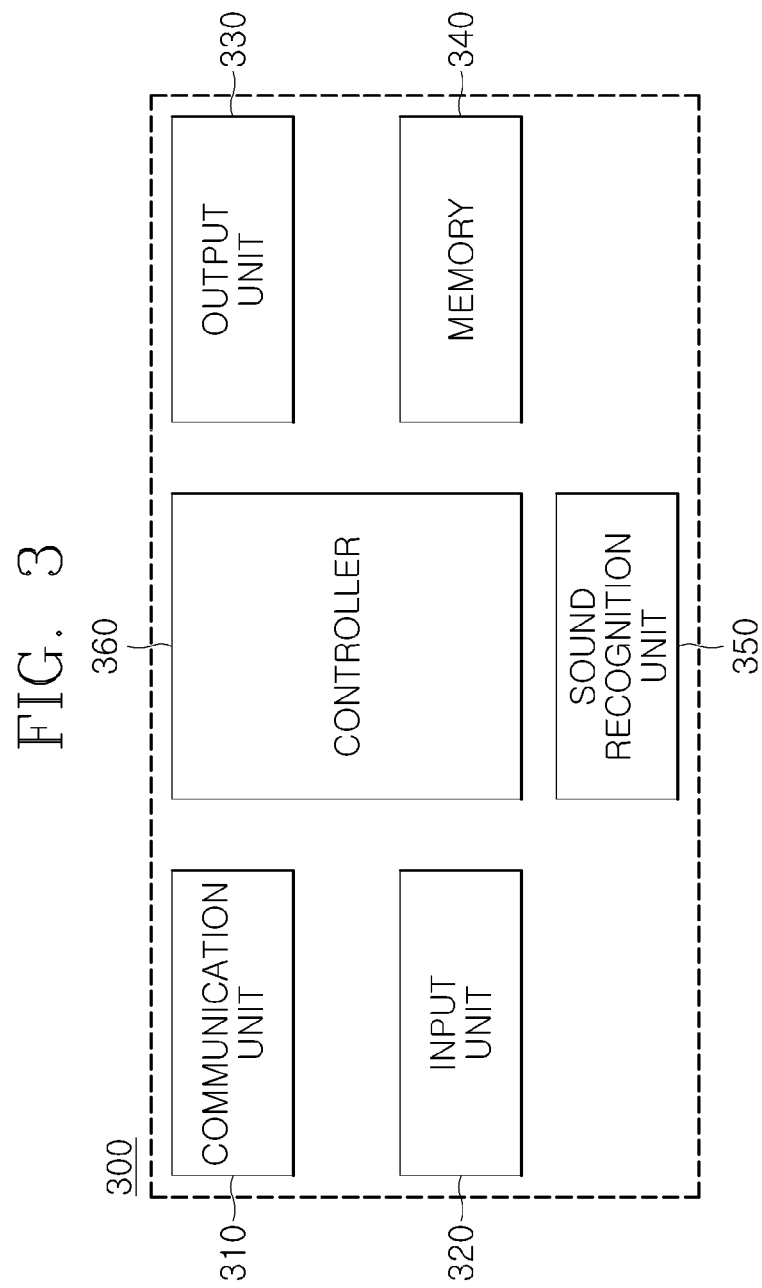
FIG. 3 is a block diagram illustrating the configuration of a user terminal according to an embodiment of the disclosure.

FIG. 3 is a block diagram illustrating the configuration of the user terminal 300 according to an embodiment of the disclosure.

Referring to FIG. 3, the user terminal 300 according to the disclosure may include a communication unit 310, an input unit 320, an output unit 330, a memory 340, a sound recognition unit 350, and a controller 360. The components illustrated in FIG. 3 are not necessarily essential to configure the user terminal, and the user terminal described herein may have more or fewer components than the components listed above.

The communication unit 310 may include a wired communication module for supporting a wired network and a wireless communication module for supporting a wireless network. The wired communication module may transmit or receive a wired signal to or from at least one of an external server and a different terminal via a wired communication network established according to technical standards or communication modes for wired communication (e.g., Ethernet, power-line communication (PLC), Home PNA, IEEE 1394, and the like). The wireless communication module may transmit or receive a wireless signal to or from at least one of a base station, an AP, and a relay via a wireless communication network established according to technical standards or communication modes for wireless communication (e.g., a wireless LAN (WLAN), wireless fidelity (Wi-Fi), Digital Living Network Alliance (DLNA), Global System For Mobile Communications (GSM), code-division multiple access (CDMA), wideband CDMA (WCDMA), Long-Term Evolution (LTE), LTE-Advanced (LTE-A), and the like).

In this embodiment, the communication unit 310 may receive video content, scene meta-information for each playback section of the video content, a video slide file including a plurality of pieces of page information corresponding to the scene meta-information for each playback section, or the like from a server 200. Further, the communication unit 310 may transmit video content uploaded by the user terminal 300, information about a video slide service requested by the user terminal 300, or the like to the server 200.

The input unit 320 may include a camera for inputting an image signal, a microphone for inputting an audio signal, a user input unit (e.g., a keyboard, a mouse, a touch key, or a mechanical key) for receiving information from a user, and the like. Data obtained by the input unit 320 may be analyzed and processed as a control command of a terminal user. In this embodiment, the input unit 320 may receive command signals associated with a video playback service and a video slide service.

The output unit 330 is for generating output associated with a visual, auditory, or tactile sense and may include at least one of a display unit, a sound output unit, a haptic module, and a light output unit.

The display unit may be in the form of a display screen or panel, and displays (outputs) information processed by the user terminal 300. In this embodiment, the display unit may display execution screen information about a video playback program driven in the user terminal 300, execution screen information of a video slide program driven in the user terminal 300, or user interface (UI) information or graphical user interface (GUI) information according to execution screen information.

The display unit may form a layer structure along with a touch sensor or is integrated therewith, thereby configuring a touchscreen. The touchscreen may not only function as a user input unit that provides an input interface between the user terminal 300 and a viewer but also provide an output interface between the user terminal 300 and the viewer.

The sound output unit may output audio data received from the communication unit 310 or stored in the memory 340. In this embodiment, the sound output unit may output a sound signal associated with the video playback service or the video slide service provided from the user terminal 300.

The memory 340 stores data for supporting various functions of the user terminal 300. In this embodiment, the memory 340 may store the video playback program (or application) driven in the user terminal 300, the video slide program (or application) driven in the user terminal 300, and data and instructions for the operation of the user terminal 300. In addition, the memory 340 may store a plurality of pieces of image content, scene meta-information for each playback section about the plurality of pieces of image content, a video slide file including a plurality of pieces of page information corresponding to the scene meta-information, or the like.

The memory 340 may include a storage medium of at least one type among a flash memory type, a hard disk type, a solid state disk (SSD) type, a silicon disk drive (SDD) type, a multimedia card micro type, a memory card type (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The sound recognition unit 350 may classify a sound signal by analyzing characteristics of the sound signal input through a microphone and may generate textualized sound information by performing sound recognition on the sound signal. Here, the sound recognition unit 350 may use a predetermined sound recognition algorithm.

The sound recognition unit 350 may provide the detected textualized sound information to the controller 360. In this embodiment, the sound information detected through the sound recognition unit 360 may be used as a control command of the user.

The controller 360 controls an operation associated with the video playback program or the video slide program stored in the memory 340 and generally controls the overall operation of the user terminal 300. The controller 360 may control a combination of at least one of the foregoing components in order to implement various embodiments to be described below on the user terminal 300 according to the disclosure.

In this embodiment, the controller 360 may provide the video playback service based on video content received from the server 200 or stored in the memory 340. In addition, the controller 360 may provide the video slide service based on scene meta-information for each playback section about video content received from the server 200. The controller 360 may also provide the video slide service based on a video slide file related to video content received from the server 200.

In another embodiment, the controller 360 may directly generate scene meta-information for each playback section using video content received from the server 200 or stored in the memory 340, may generate a plurality of pieces of page information corresponding to the scene meta-information for each playback section, and may provide the video slide service based on the plurality of pieces of page information.

The control unit 360 may be a processor or multiple processors. Although it is not shown in drawings, the processor may comprise functional units (i.e., means) for performing S605, S630, S650, S655, and S660 steps of FIG. 6, and S705 to S775 steps of FIG. 7.

Figure 4:
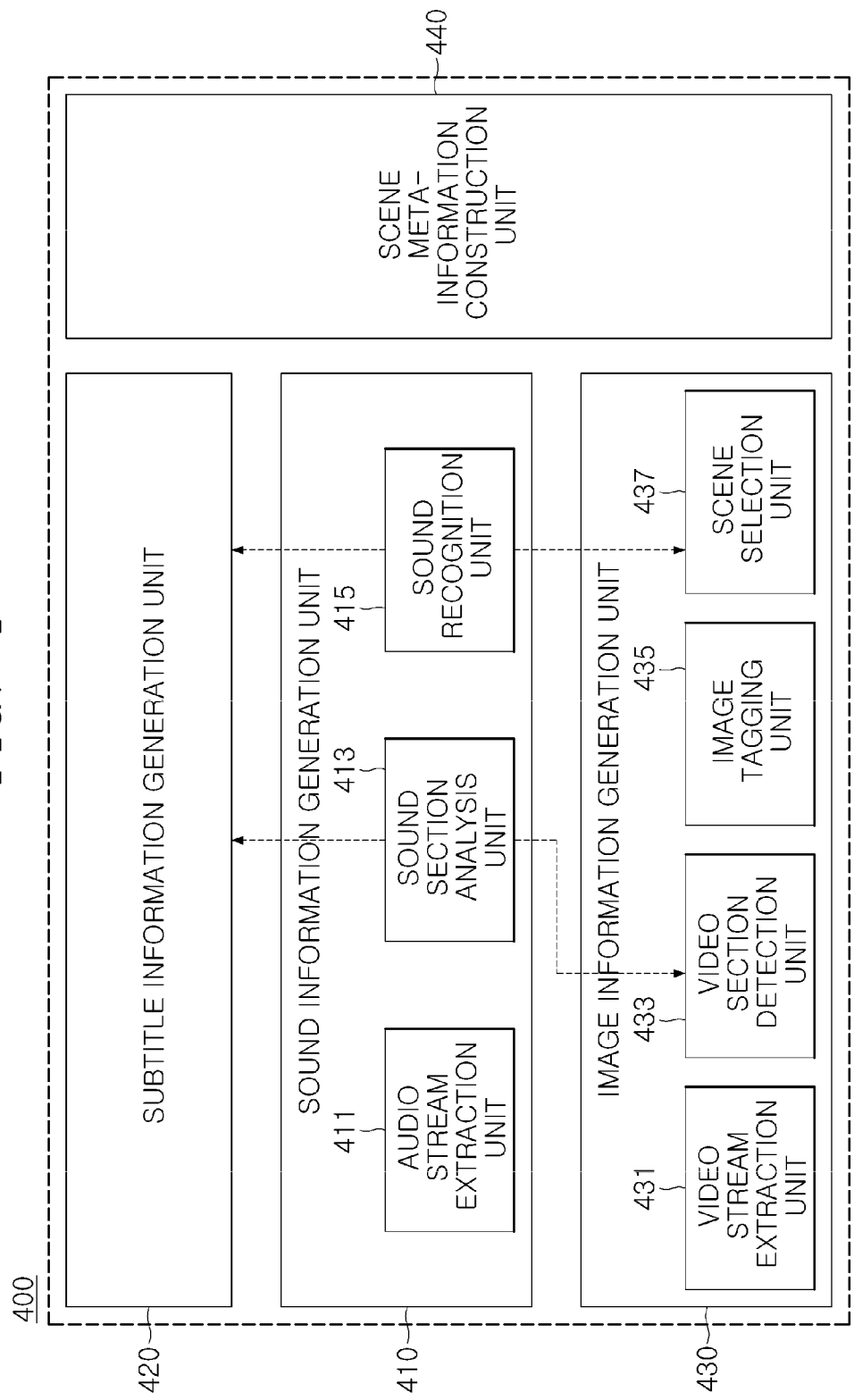
FIG. 4 is a block diagram illustrating a scene meta-information generation device according to an embodiment of the disclosure.

FIG. 4 is a block diagram illustrating a scene meta-information generation device 400 according to an embodiment of the disclosure.

Referring to FIG. 4, the scene meta-information generation device 400 according to the disclosure may include a sound information generation unit 410, a subtitle information generation unit 420, an image information generation unit 430, and a scene meta-information construction unit 440. The components illustrated in FIG. 4 are not necessarily essential to configure the scene meta-information generation device 400, and the scene meta-information generating device 400 described herein may have more or fewer components than the components listed above.

The scene meta-information generation device 400 may be configured as the scene meta-information generation unit 230 of the server 200 or may be configured as the controller 360 of the user terminal 300 but is not necessarily limited thereto.

The sound information generation unit 410 may detect a plurality of sound sections based on audio information extracted from video content and may generate a plurality of pieces of sound information corresponding to the detected sound sections. In addition, the sound information generation unit 410 may generate textualized sound information by performing sound recognition on audio information about each sound section.

The sound information generation unit 410 may include an audio stream extraction unit 411 to detect audio information about video content, a sound section analysis unit 413 to detect sound sections of video content, and a sound recognition unit 415 to perform sound recognition of audio information about each sound section.

The audio stream extraction unit 411 may extract an audio stream based on an audio file included in video content. The audio stream extraction unit 411 may divide the audio stream into a plurality of audio frames suitable for signal processing. Here, the audio stream may include a sound stream and a non-sound stream.

The sound section analysis unit 413 may analyze a frequency component, a pitch component, mel-frequency cepstral coefficients (MFCCs), and a linear predictive coding (LPC) coefficient of each audio frame, thereby extracting characteristics of the audio frame. The sound section analysis unit 413 may determine whether each audio frame is a sound section using the characteristics of each audio frame and a predetermined sound model. Here, as the sound model, at least one of a support vector machine (SVM) model, a hidden Markov model (HMM) model, a Gaussian mixture model (GMM) model, a recurrent neural network (RNN) model, and a long short-term memory (LSTM) model may be used.

The sound section analysis unit 413 may combine audio frames corresponding to a sound section and may detect the start time and the end time of each sound section. Here, the start time of each sound section may correspond to a playback time of the video content at which sound output starts in the section, and the end time of each sound section corresponds to a playback time of the video content at which the sound output ends in the section. The audio section analysis unit 413 may provide information about the sound section of the video content to the subtitle information generation unit 420 and/or the image information generation unit 430.

The sound recognition unit 415 may analyze a frequency component, a pitch component, an energy component, a zero-crossing component, MFCCs, an LPC coefficient, and a perceptual linear predictive (PLP) coefficient of sound information corresponding to each sound section, thereby detecting feature vectors of the sound information. The sound recognition unit 415 may classify a pattern of the detected feature vectors using a predetermined sound model and may recognize a sound through the pattern classification, thereby detecting one or more candidate words. Further, the sound recognition unit 415 may generate textualized sound information by constructing a sentence using the candidate words based on a predetermined language model. The sound recognition unit 415 may provide the textualized sound information to the subtitle information generation unit 420 and/or the image information generation unit 430.

The subtitle information generation unit 420 may generate a plurality of pieces of subtitle information corresponding to the sound sections of the video content based on the textualized sound information received from the sound information generation unit 410. That is, when a subtitle file does not exist in the video content, the subtitle information generation unit 420 may generate new subtitle information by performing sound recognition of the audio information included in the video content.

When a subtitle file exists in the video content, the subtitle information generation unit 420 may detect a plurality of subtitle sections based on the subtitle file and may detect pieces of subtitle information corresponding to the subtitle sections. In this case, the subtitle information generation unit 420 may correct the plurality of subtitle sections and/or the pieces of subtitle information using the audio information extracted from the video content.

The image information generation unit 430 may detect a video section corresponding to each sound section and may select a scene image most similar to the text information or the textualized sound information (i.e., a representative image) from among a plurality of scene images existing in the video section.

The image information generation unit 430 may include a video stream extraction unit 431 to detect image information forming video content, a video section detection unit 433 to detect a video section corresponding to each sound section, an image tagging unit 435 to generate tag information from images of each video section, and a scene selection unit 327 to select a representative image from among the images of each video section.

The video stream extraction unit 431 may extract a video stream based on a video file included in the video content. Here, the video stream may include successive image frames.

The video section extraction unit 433 may detect a video section corresponding to each sound section from the video stream. This process is for excluding a video section of relatively low importance (i.e., a video section corresponding to a non-sound section), thereby reducing time and cost required for image processing.

The image tagging unit 435 may generate image tag information by performing image recognition on each of a plurality of images (i.e., image frames) existing in each video section. That is, the image tagging unit 435 may generate image tag information by recognizing objects (e.g., a human being, an object, text, and the like) existing in each image frame. Here, the image tag information may include information about any object existing in each image frame.

The scene selection unit 437 may measure similarity between first vector information corresponding to the image tag information and second vector information corresponding to the textualized sound information using a predetermined similarity measurement method. As the similarity measurement method, at least one of a cosine similarity measurement method, a Euclidean similarity measurement method, a similarity measurement method using a Jaccard coefficient, a similarity measurement method using a Pearson correlation coefficient, and a similarity measurement method using Manhattan distance may be used.

The scene selection unit 437 may detect an image corresponding to image tag information having the highest similarity to the textualized sound information from the plurality of images existing in each video section and may select the detected image as a representative image of the section.

In another embodiment, the scene selection unit 437 may detect an image corresponding to image tag information having the highest similarity to the subtitle information from the plurality of images existing in each video section and may select the detected image as a representative image of the section.

The scene meta-information construction unit 440 may construct scene meta-information for each playback section based on sound section information, unit subtitle information, unit sound information, and representative image information obtained from the sound information generation unit 410, the subtitle information generation unit 420, and the image information generation unit 430.

For example, as illustrated in FIG. 5, the scene meta-information construction unit 440 may generate a scene meta-information frame 500 including an ID field 510, a time code field 520, a representative image field 530, a sound field 540, a subtitle field 550, and an image tag field 560. Here, the scene meta-information construction unit 440 may generate as many scene meta-information frames as the number of subtitles or sound sections.

The ID field 510 is a field for identifying scene meta-information for each playback section, and the time code field 520 is a field indicating a subtitle or a sound section corresponding to the scene meta-information. Preferably, the time code field 520 is a field indicating a sound section corresponding to the scene meta-information.

The representative image field 530 is a field indicating a representative image for each sound section, and the sound field 540 is a field indicating sound information about each sound section. The subtitle field 550 is a field indicating subtitle information about each sound section, and the image tag field 560 is a field indicating image tag information about sound audio section.

When representative images of pieces of scene meta-information corresponding to adjacent playback sections are similar, the scene meta-information construction unit 440 may merge the pieces of scene meta-information into a single piece of scene meta-information. Here, the scene meta-information construction unit 440 may determine the similarity between the representative images using a predetermined similarity measurement algorithm (e.g., a cosine similarity measurement algorithm, a Euclidean similarity measurement algorithm, or the like).

As described above, the scene meta-information generation device according to the disclosure may generate scene meta-information for each playback section based on information extracted from video content. The scene meta-information for each playback section may be used to provide a video slide service.

Figure 6:
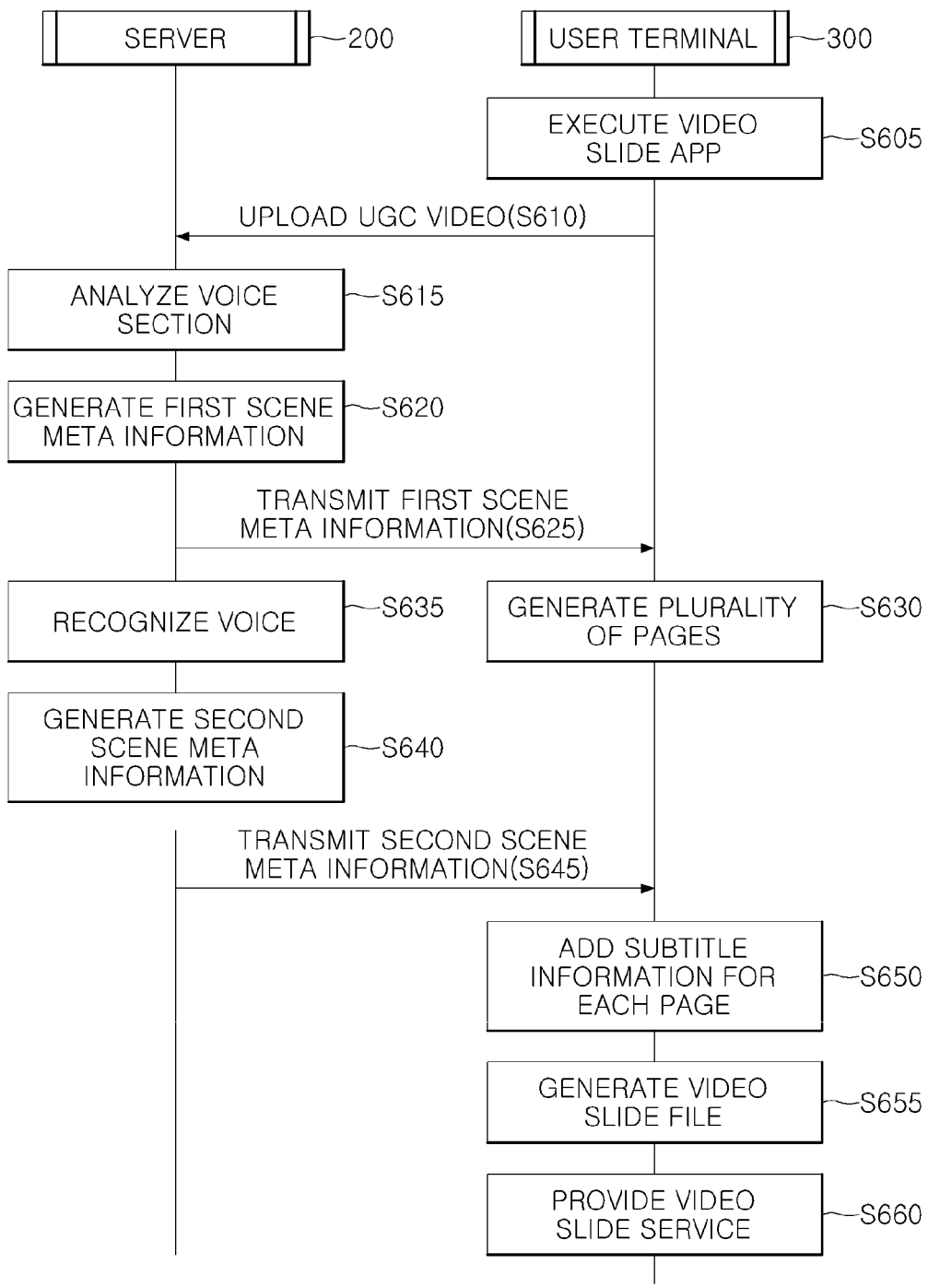
FIG. 6 is a flowchart illustrating signaling of a content providing system according to an embodiment of the disclosure.

FIG. 6 is a flowchart illustrating signaling of the content providing system 10 according to an embodiment of the disclosure.

Referring to FIG. 6, a user terminal 300 may execute a video slide application according to a user command or the like (S605). Here, the video slide application is an application that provides a user interface enabling viewing of a video by turning over pages like a book.

When the application is executed, the user terminal 300 may display a predefined user interface (UI) on the display unit of the output unit 330. When a UGC video is selected through an upload menu of the user interface, the user terminal 300 may upload the selected UGC video to a server 200 (S610).

The server 200 may detect audio information from the UGC video uploaded from the user terminal 300 and may extract information about sound sections of the video based on the detected audio information (S615).

The server 200 may generate first scene meta-information including a time code, representative image information, and sound information for each playback section using the extracted information about the sound sections (S620). The server 200 may store the UGC video uploaded from the user terminal 300 and the first scene meta-information about the UGC video in the database 220.

The server 200 may transmit the first scene meta-information to the user terminal 300 (S625). Here, the server 200 may transmit this data by streaming. The user terminal 300 may generate a plurality of pages based on the first scene meta-information received from the server 200 (S630). Here, the plurality of pages does not include subtitle information.

The server 200 may generate textualized sound information by performing sound recognition of sound information corresponding to each sound section (S635). The server 200 may generate subtitle information for each playback section based on the textualized sound information and may generate second scene meta-information including the subtitle information for each playback section (S640). The server 200 may store the second scene meta-information about the UGC video in the database 220.

The server 200 may transmit the second scene meta-information to the user terminal 300 (S645). Likewise, the server 200 may transmit this data by streaming. Although this embodiment shows that the server 200 completes sound recognition of all sound sections and then transmits subtitle information about all the sound sections, the disclosure is not limited thereto. Instead, it will be apparent to those skilled in the art that the server 200 can transmit subtitle information corresponding to each sound section whenever performing sound recognition of the sound section.

The user terminal 300 may add subtitle information to each page using the second scene meta-information received from the server 200 (S650). That is, the user terminal 300 may generate a plurality of pieces of page information based on the first and second scene meta-information.

The user terminal 300 may generate a video slide file including the plurality of pieces of page information (S655). Here, each piece of page information is information for providing a video slide service and is information in which at least one of representative image information, subtitle information, and sound information is configured in a page form. For example, each piece of page information may include representative image information and subtitle information or may include representative image information, subtitle information, and sound information.

The user terminal 300 may store the video slide file in the memory 340. The user terminal 300 may provide the video slide service based on the video slide file stored in the memory 340 (S660). Accordingly, a terminal user may view the UGC video produced by the terminal user 300 in page units like a book.

Although this embodiment shows that the server 200 sequentially generates and transmits the first scene meta-information and the second scene meta-information due to the difference between time required for sound section analysis and time required for sound recognition, the disclosure is not limited thereto. Therefore, it will be apparent to those skilled in the art that one scene meta-information data may be generated and transmitted to the user terminal 300 after both sound section analysis and sound recognition are completed.

In another embodiment, the server 200 may generate not only scene meta-information for each playback section about the UGC video but also a video slide file including on a plurality of pieces of page information corresponding to the scene meta-information for each playback section and may transmit the scene meta-information and the video slide file to the user terminal 300.

FIG. 7 is a flowchart illustrating the operation of a user terminal according to an embodiment of the disclosure.

Referring to FIG. 7, the user terminal 300 may execute a video slide application according to a user command or the like (S705).

When the application is executed, the user terminal 300 may display a predefined user interface on the display unit of the output unit 330. Here, the user interface may include an image list area including thumbnail images corresponding to video slide files and a menu area including operation menus of the video slide application but is not limited thereto.

When an upload menu is selected through the user interface (S710), the user terminal 300 may display a selection list screen including thumbnail images corresponding to UGC videos stored in 340 memory on the display unit. When at least one UGC video is selected on the selection list screen, the user terminal 300 may upload the selected UGC video to the server 200 (S715).

In another embodiment, when the upload menu is selected, the user terminal 300 may enter a video recording mode and may generate a new UGC video in real time. When video recording is completed, the user terminal 300 may upload the generated new UGC video to the server 200.

The server 200 may generate scene meta-information for each playback section based on information included in the UGC video uploaded from the user terminal 300. The server 200 may transmit the scene meta-information for each playback section to the user terminal 300.

The user terminal 300 may receive the scene meta-information for each playback section about the uploaded UGC video from the server 200 (S720). The user terminal 300 may generate a video slide file including pieces of page information corresponding to the scene meta-information for each playback section and may store the video slide file in the memory 340. The user terminal 300 may display a thumbnail image corresponding to the video slide file stored in the memory 340 in the image list area of the user interface.

The user terminal 300 may display a pop-up window on the display unit of the output unit 330 for asking whether to share the video slide file stored in the memory 340 with others (S725). When a sharing menu is selected through the pop-up window, the user terminal 300 may share the video slide file with others. Here, people with whom the file is shared may be those who have subscribed to a specific website or have installed the video slide application but are not necessarily limited thereto.

When the thumbnail image displayed on the user interface is selected (S735), the user terminal 300 may enter a video slide mode and may execute the video slide file corresponding to the selected thumbnail image (S740).

In the video slide mode, the user terminal 300 may display the screen of a first page among a plurality of pages forming the video slide file on the display unit. Here, the screen of the page may include representative image information and subtitle information for each playback section of the UGC video. In addition, when the screen of the page is displayed, the user terminal 300 may output sound information corresponding to the page.

The user terminal 300 may display the screen of the next page or the screen of the previous page on the display unit in response to a predetermined gesture input (e.g., a directional flicking input).

When a mode switch menu is selected in the video slide mode (S745), the user terminal 300 may switch the video slide mode to a video playback mode and may play the UGC video corresponding to a sound section of the current page (S750).

Further, when a sound recognition menu is selected in the video slide mode (S755), the user terminal 300 may activate a microphone in the input unit 320 and may enter a sound recognition mode. When a user's voice command is input through the microphone in the sound recognition mode, the user terminal 300 may execute a video slide operation corresponding to the voice command (S760). For example, the user terminal 300 may perform a page turning function, a mode switch function (video slide mode⇔video mode), a subtitle search function, an automatic playback function, a deletion/editing/sharing function, or the like through the voice command.

In addition, when a predetermined gesture input is received in the video slide mode (S765), the user terminal 300 may perform a high-speed search function (S770). That is, the user terminal 300 may change (move) a page screen related to the UGC video at a predetermined speed. Furthermore, the user terminal 300 may perform a subtitle search function and a tag search function.

The user terminal 300 may repeatedly perform operation 710 to operation 770 described above until the video slide application is terminated. Although this embodiment shows that the video slide service is provided by an independent application, the disclosure is not limited thereto. Instead, it will be apparent to those skilled in the art that the video slide service may be provided through an additional function of a general video playback application.

Figure 8A:
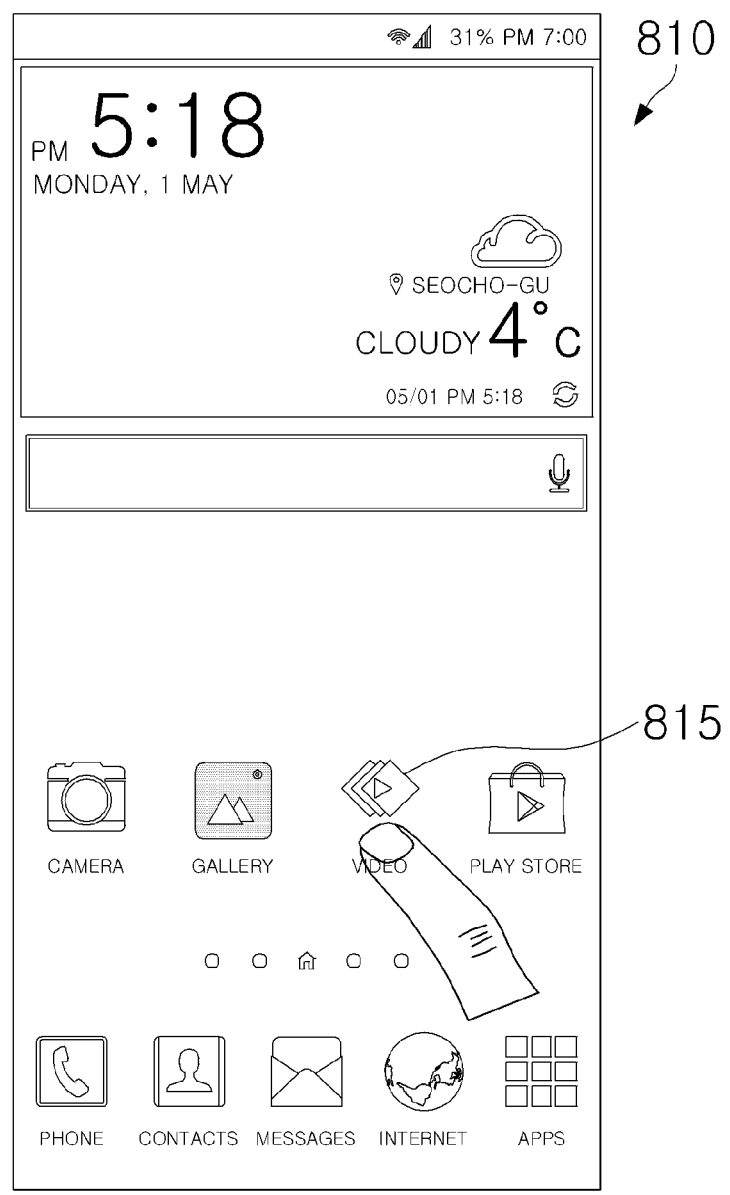
FIGS. 8A and 8B illustrate an operation in which a user terminal displays a main screen of a video slide application.
Figure 8B:
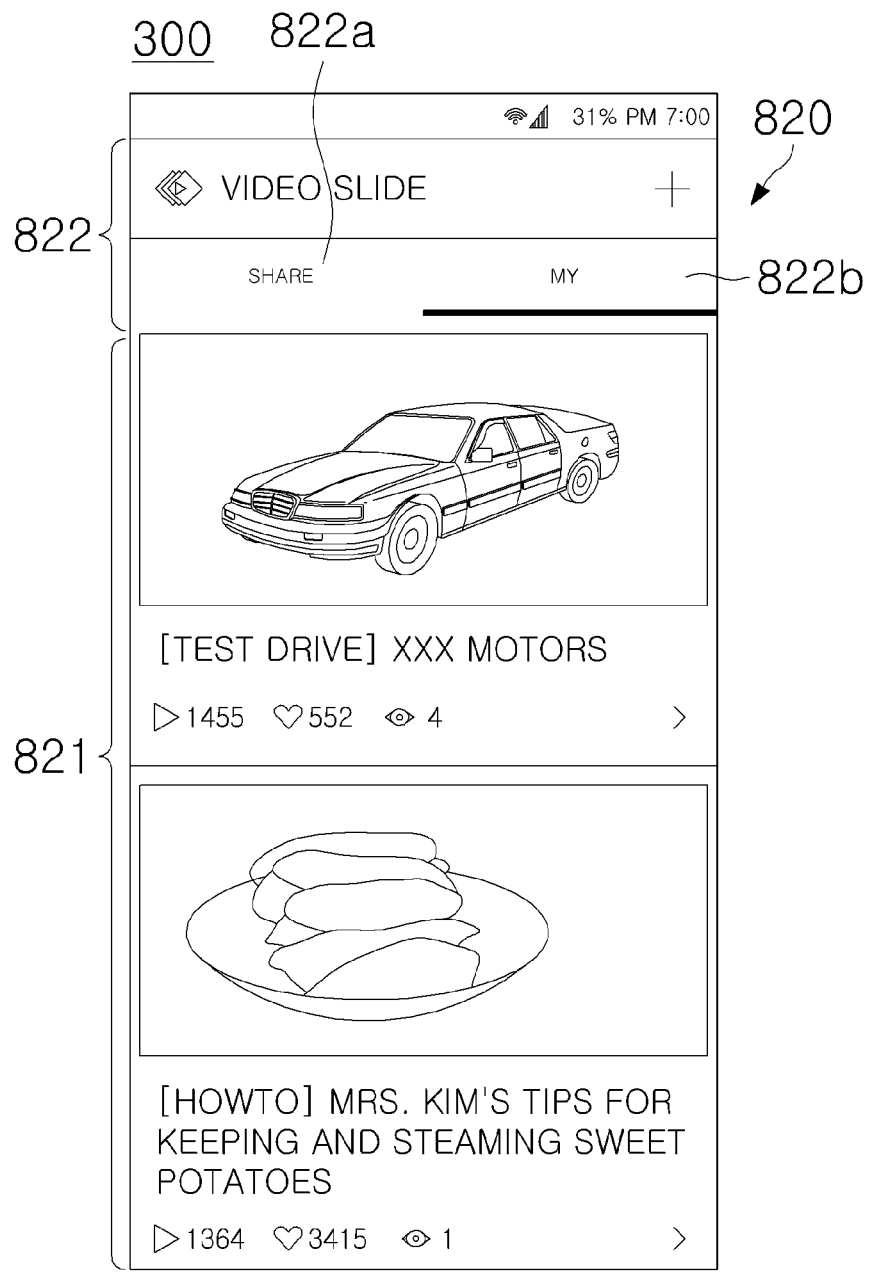

FIGS. 8A and 8B illustrate an operation in which a user terminal displays a main screen of a video slide application.

Referring to FIGS. 8A and 8B, the user terminal 300 may display a home screen 810 on the display unit of the output unit 330 according to a user command or the like. Here, it is assumed that the home screen 810 includes an app icon 815 corresponding to a video slide application.

When the app icon 815 is selected by a terminal user, the user terminal 300 may execute the video slide application corresponding to the selected app icon 815.

When the application is executed, the user terminal 300 may display a predefined user interface 820 on a display unit. The user interface 820 may include an image list area 821 including thumbnail images corresponding to video slide files and a menu area 822 displayed in an upper portion of the image list area 821. The menu area 822 may include a share list menu 822a and a "my list" menu 822b. Title information about a corresponding video slide file may be displayed under each thumbnail image.

When the share list menu 822a is selected, the user terminal 300 may display thumbnail images corresponding to shared video slide files in the image list area 821. When the "my list" menu 822b is selected, the user terminal 300 may display thumbnail images corresponding to video slide files stored in a memory on the image list area 821.

FIGS. 9A to 10C illustrate an operation in which a user terminal uploads a UGC video and receives scene meta-information for each playback section.

Referring to FIGS. 9A to 10C, when a video slide application is executed, the user terminal 300 may display a predefined user interface 910 on the display unit of the output unit 300.

Figure 9A:
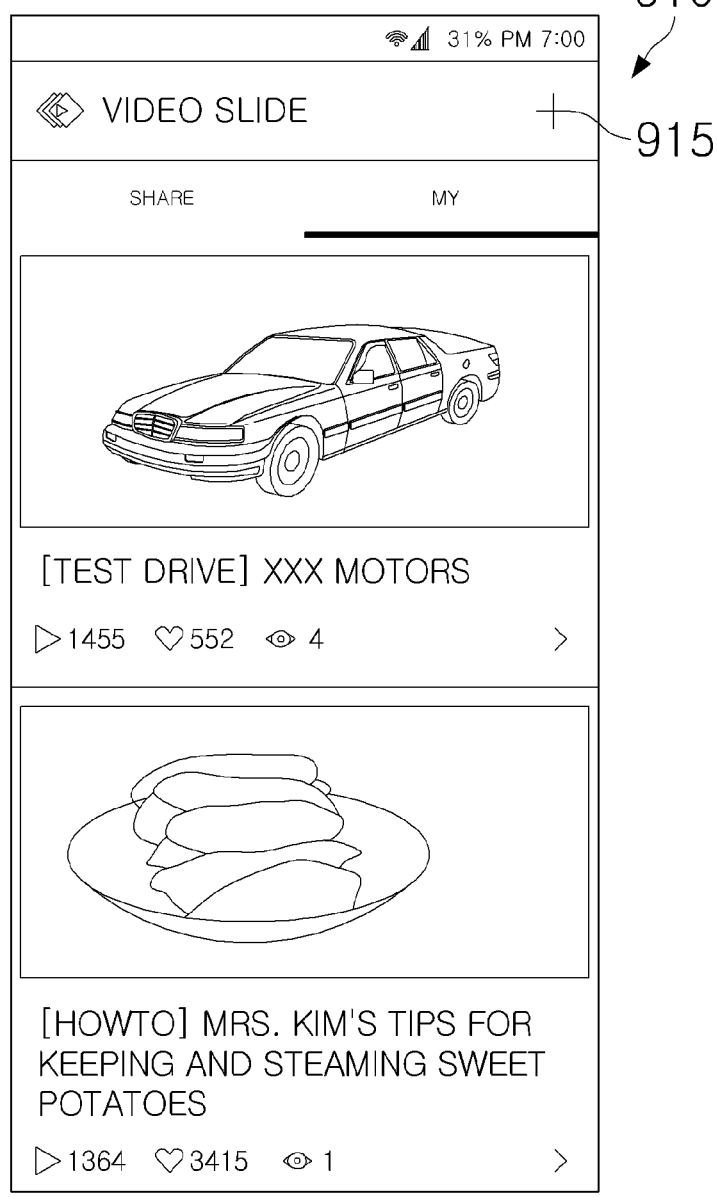
FIGS. 9A-9B and 10A-10C illustrate an operation in which a user terminal uploads a UGC video and receives scene meta-information for each playback section.
Figure 9B:
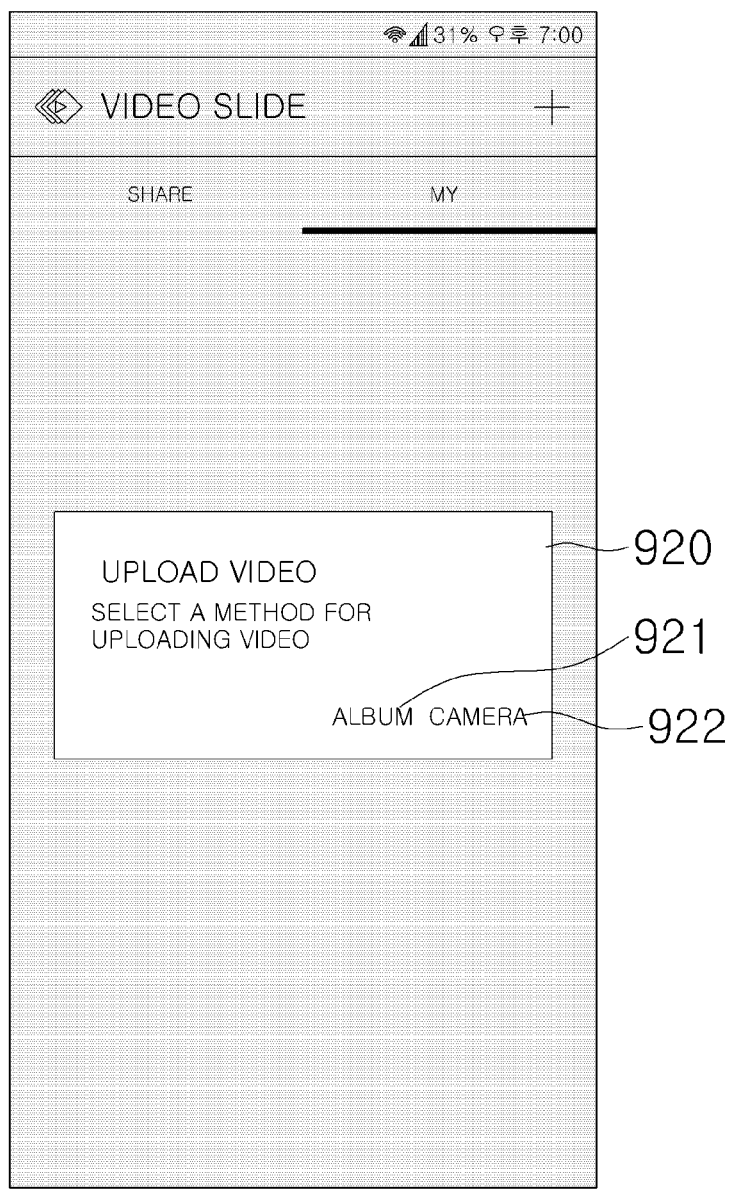

When an upload menu 915 displayed in one area of the user interface 910 is selected, the user terminal 300 may display a pop-up window 920 for selecting a method for uploading a UGC video on the display unit (FIG. 9B). The pop-up window 920 may include an album menu 921 and a camera menu 922.

When the album menu 921 of the pop-up window 920 is selected, the user terminal 300 may display a selection list screen (not shown) including thumbnail images corresponding to UGC videos stored in the memory 340 on the display unit. When at least one thumbnail image is selected on the selection list screen, the user terminal 300 may upload a UGC video corresponding to the selected thumbnail image to the server 200.

When the camera menu 922 of the pop-up window 920 is selected, the user terminal 300 may enter a video recording mode and may generate a new UGC video. When video recording is completed, the user terminal 300 may upload the generated new UGC video to the server 200.

Figure 10A:
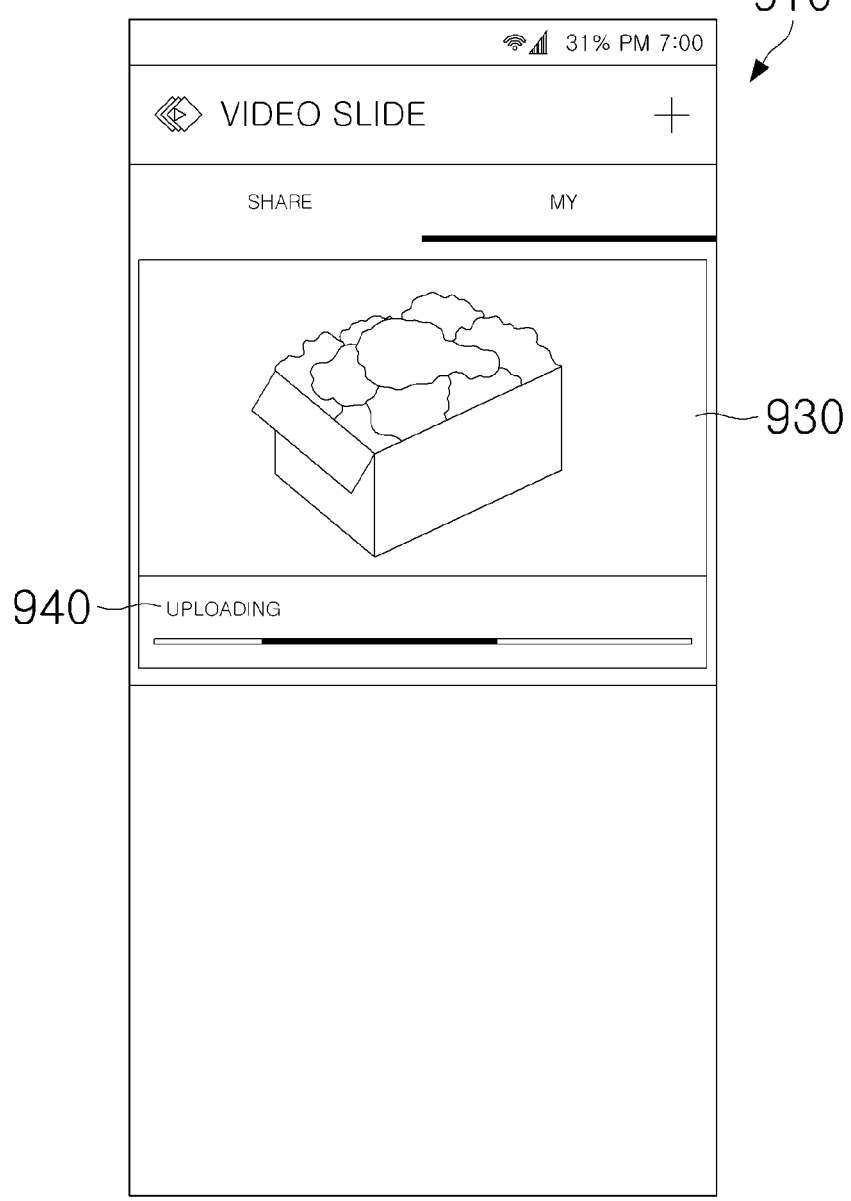
Figure 10B:
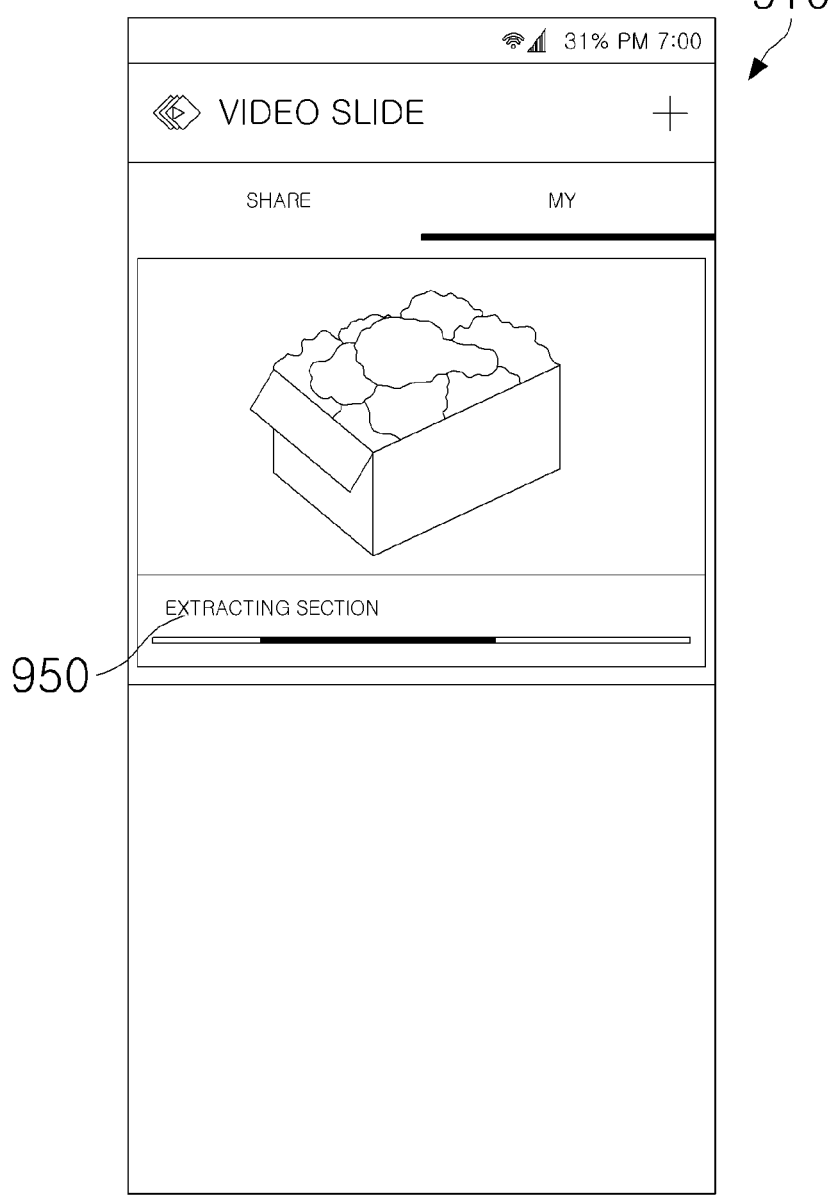
Figure 10C:
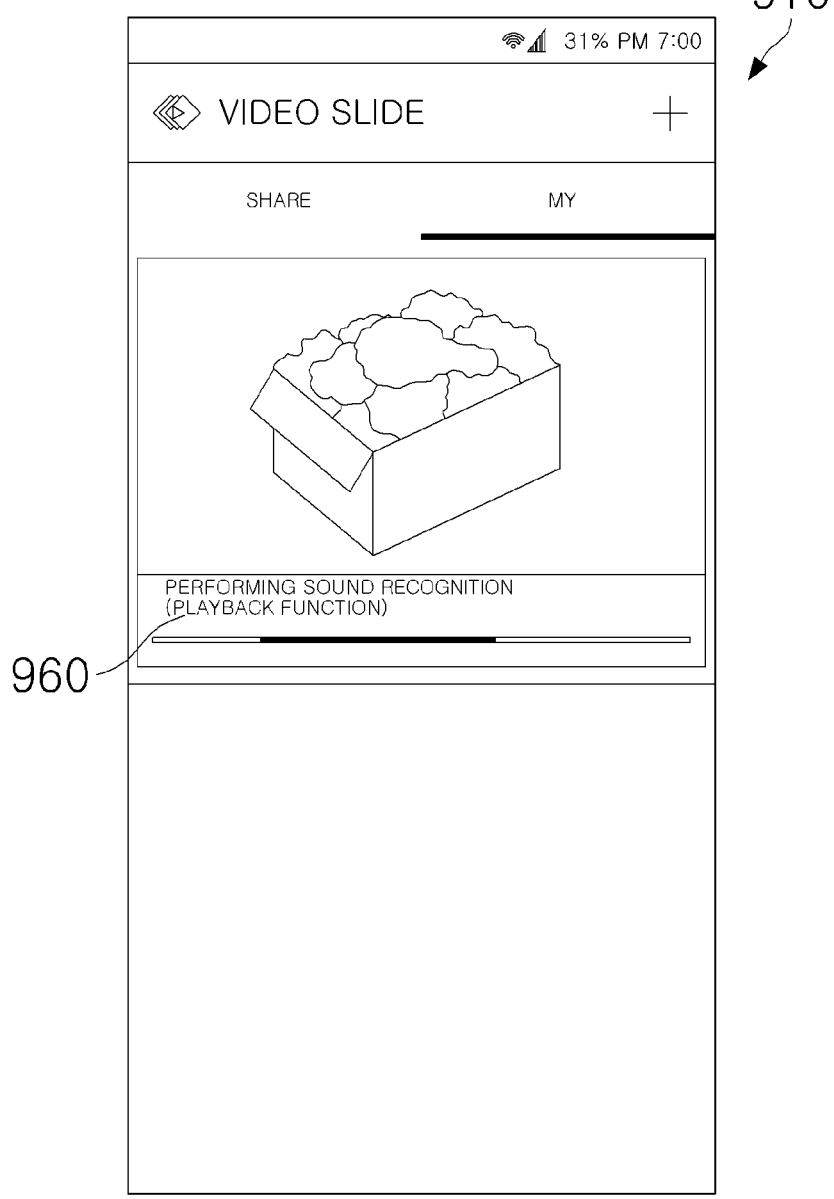

When a UGC video 930 selected through the pop-up window 920 is uploaded to the server 200, the user terminal 300 may display notification information 940, 950, and 960 indicating a process of converting the UGC video into a video slide file on the display unit. For example, as illustrated in FIGS. 10A to 10C, the user terminal 300 may sequentially display notification messages such as "uploading," "extracting a sound section," and "performing sound recognition." When the conversion process is completed, the user terminal 300 may receive scene meta-information for each playback section about the uploaded UGC video from the server 200.

Figure 11A:
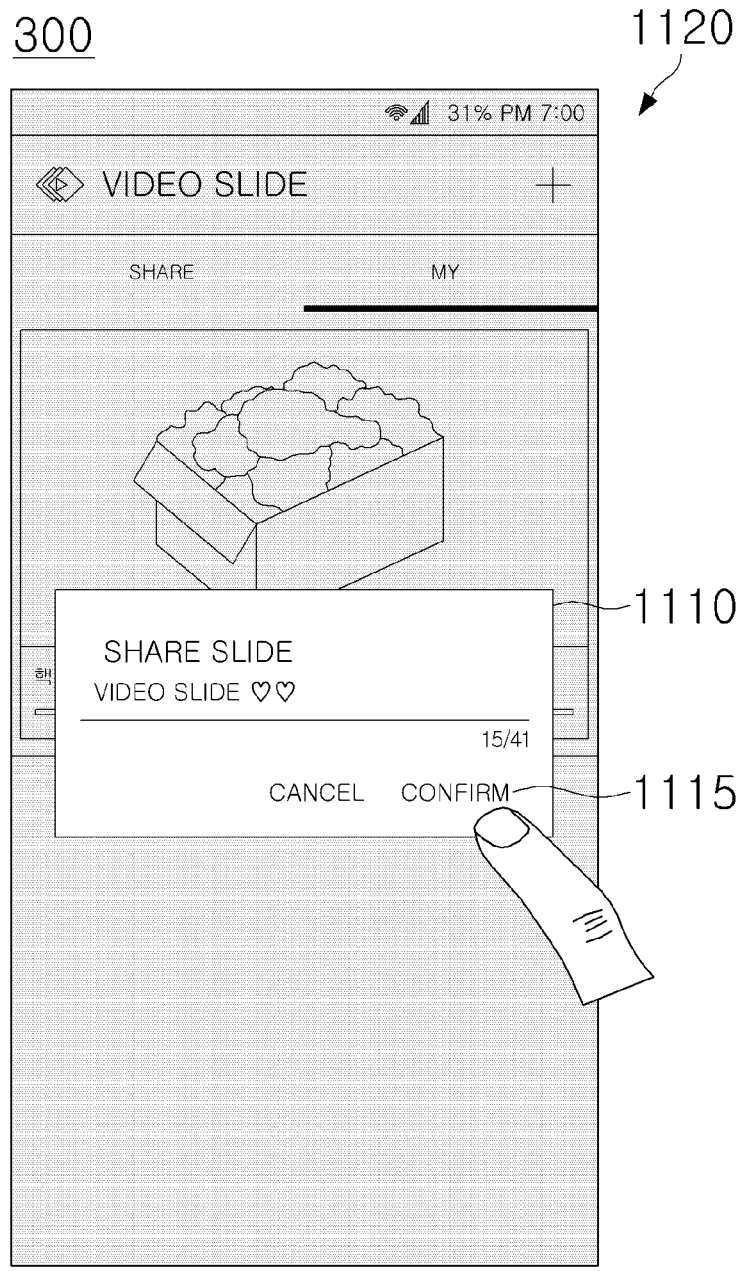
FIGS. 11A and 11B illustrate an operation in which a user terminal shares a video slide file.
Figure 11B:
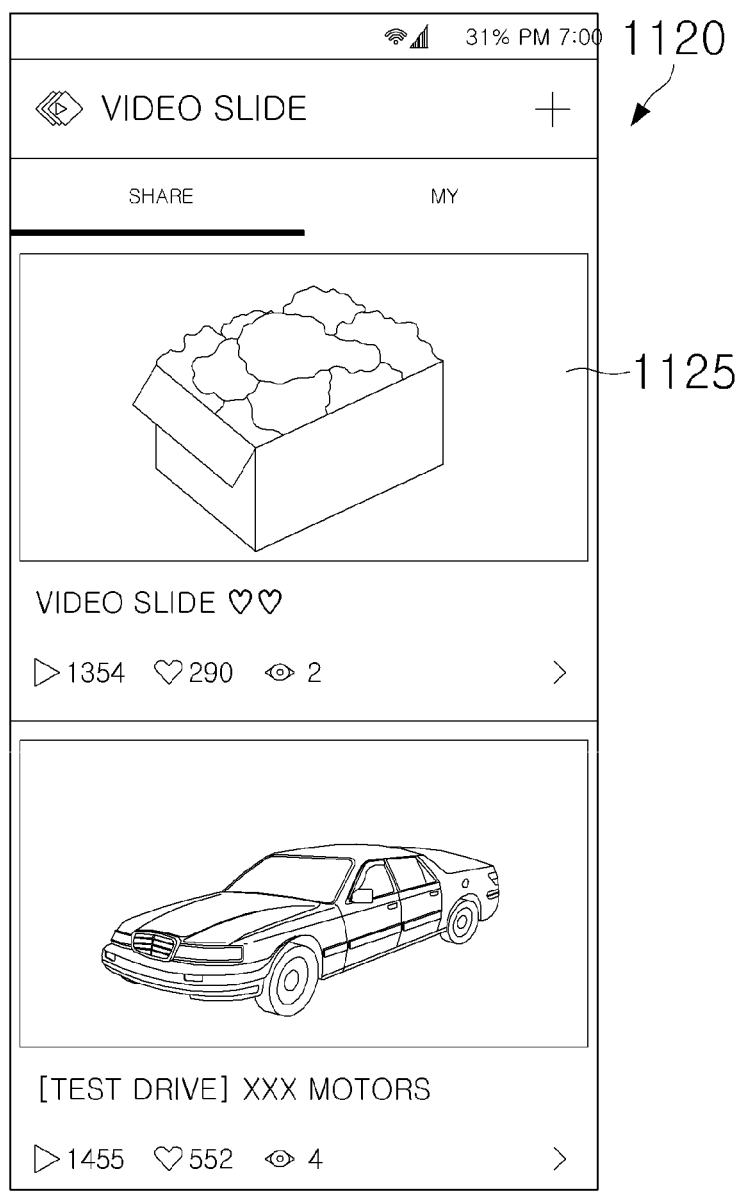

FIGS. 11A and 11B illustrate an operation in which a user terminal shares a video slide file.

Referring to FIGS. 11A and 11B, when uploading a UGC video, the user terminal 300 may receive scene meta-information for each playback section about the UGC video from the server 200 in real time. The user terminal 300 may generate a video slide file including a plurality of pages corresponding to the scene meta-information for each playback section. Here, the user terminal 300 may display a pop-up window 1110 on the display unit of the output unit 330 for asking whether to share the video slide file with others.

When a confirmation menu 1115 is selected on the pop-up window 1110, the user terminal 300 may share the video slide file with others. The user terminal 300 may display a thumbnail image 1125 corresponding to the video slide file on a user interface 1120.

FIG. 12 to FIG. 16 illustrate an operation in which a user terminal displays a UGC video by pages.

Referring to FIG. 12 to FIG. 16, when a video slide application is executed, the user terminal 300 may display a user interface including a plurality of thumbnail images on the display unit of the output unit 330. Here, the plurality of thumbnail images correspond to video slide files related to UGC videos.

When a thumbnail image is selected through the user interface, the user terminal 300 may execute (play) a video slide file corresponding to the selected thumbnail image.

That is, the user terminal 300 may enter a video slide mode in which a UGC video is displayed in pages like a book.

In the video slide mode, the user terminal 300 may display a predetermined page screen 1200 on the display unit. Here, the page screen 1200 may include an image display area 1210, a subtitle display area 1220, a first menu area 1230, and a second menu area 1240 but is not limited thereto.

Figure 12:
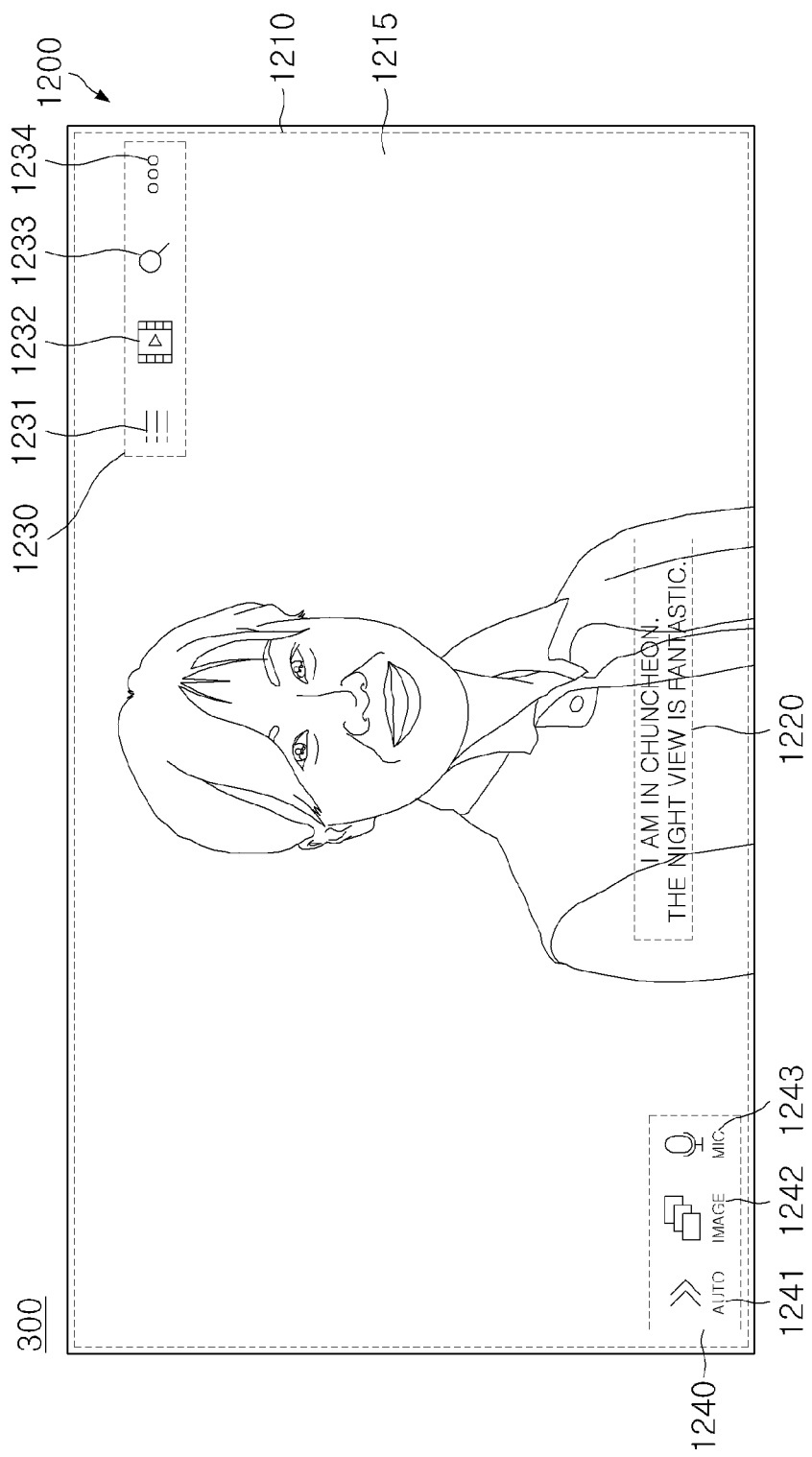
FIG. 12 to FIG. 16 illustrate an operation in which a user terminal displays a UGC video by pages.

As illustrated in FIG. 12, the image display area 1210 may include a representative image 1215 corresponding to a current page. The subtitle display area 1220 may include subtitle information corresponding to the current page. The first and second menu areas 1230 and 1240 may include a plurality of menus for executing functions related to the video slide mode.

The first menu area 1230 may include a first operation menu (main menu) 1231 for moving to a main screen, a second operation menu (mode switch menu) 1232 for viewing in a video playback mode, a third operation menu (search menu) 1233 for searching for a subtitle and/or tag, and a fourth operation menu (view more menu) 1234 for further viewing other menus. The second menu area 1240 may include a fifth operation menu (automatic switch menu) 1241 for automatically changing a page screen, a sixth operation menu (preview menu) 1242 for previewing previous and subsequent pages of the current page, and a seventh operation menu (microphone menu) 1243 for activating a sound recognition mode.

Figure 13:
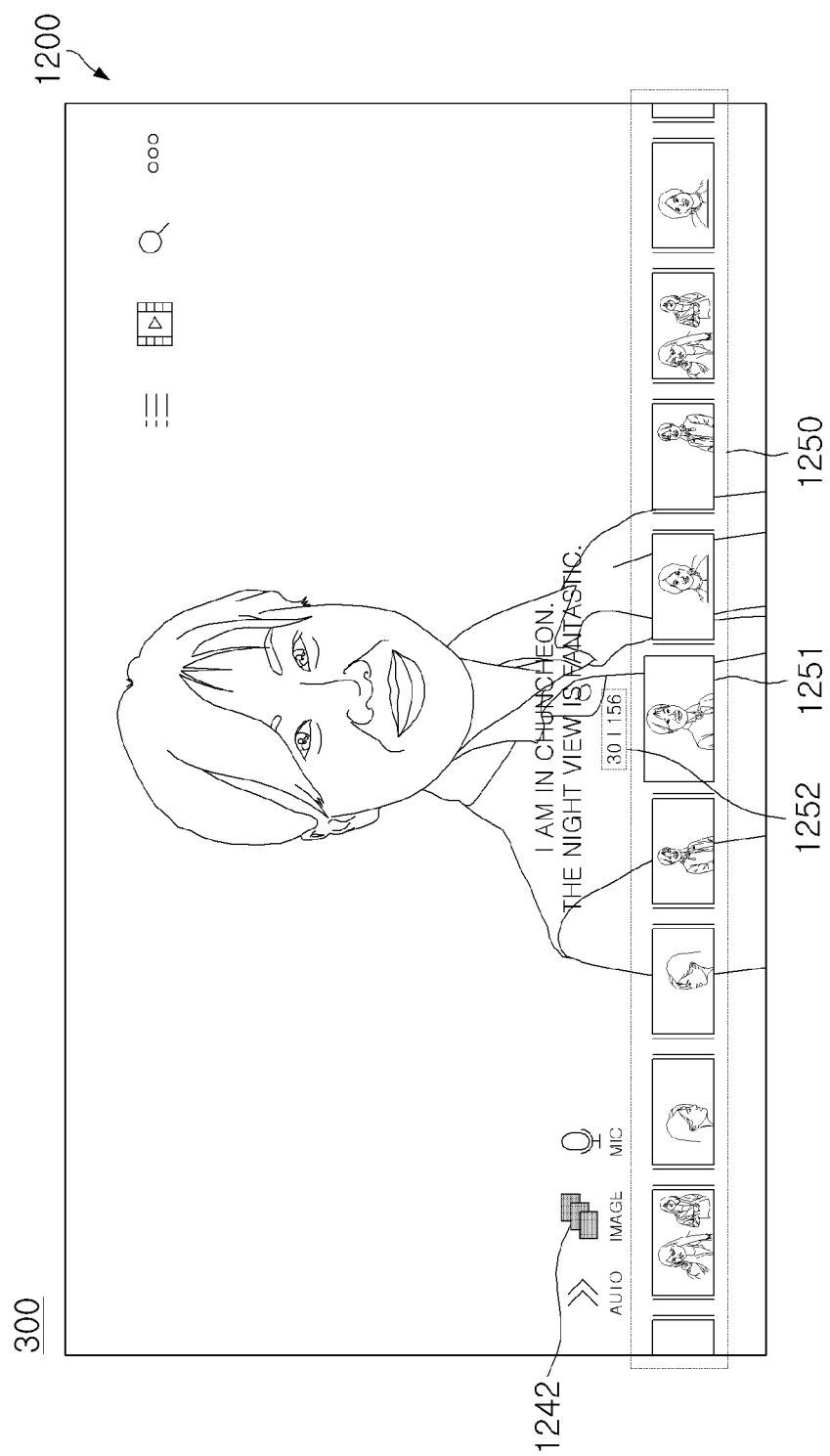

When the preview menu 1242 of the second menu area 1240 is selected with the page screen 1200 displayed, the user terminal 300 may execute a function of previewing previous and subsequent pages of the current page. For example, as illustrated in FIG. 13, the user terminal 300 may display a scroll area 1250 including a plurality of thumbnail images corresponding to pages existing before and after the current page at the bottom of the display unit. The plurality of thumbnail images is images obtained by reducing the size of representative images corresponding to a plurality of pages to a predetermined size. The plurality of thumbnail images may be sequentially arranged according to the time codes of the pages. In addition, the plurality of thumbnail images may be configured to be scrolled according to a predetermined gesture input.

A thumbnail image 1251 of the current page may be positioned in the middle of the scroll area 1250. That is, a page currently viewed by a viewer may be positioned in the middle of the scroll area 1250. The viewer may select one of the thumbnail images positioned in the scroll area 1250, thereby directly moving to a page corresponding to the thumbnail image.

When the main menu 1231 of the first menu area 1230 is selected, the user terminal 300 may terminate the video slide mode and may then move to a home page of the application.

Figure 14:
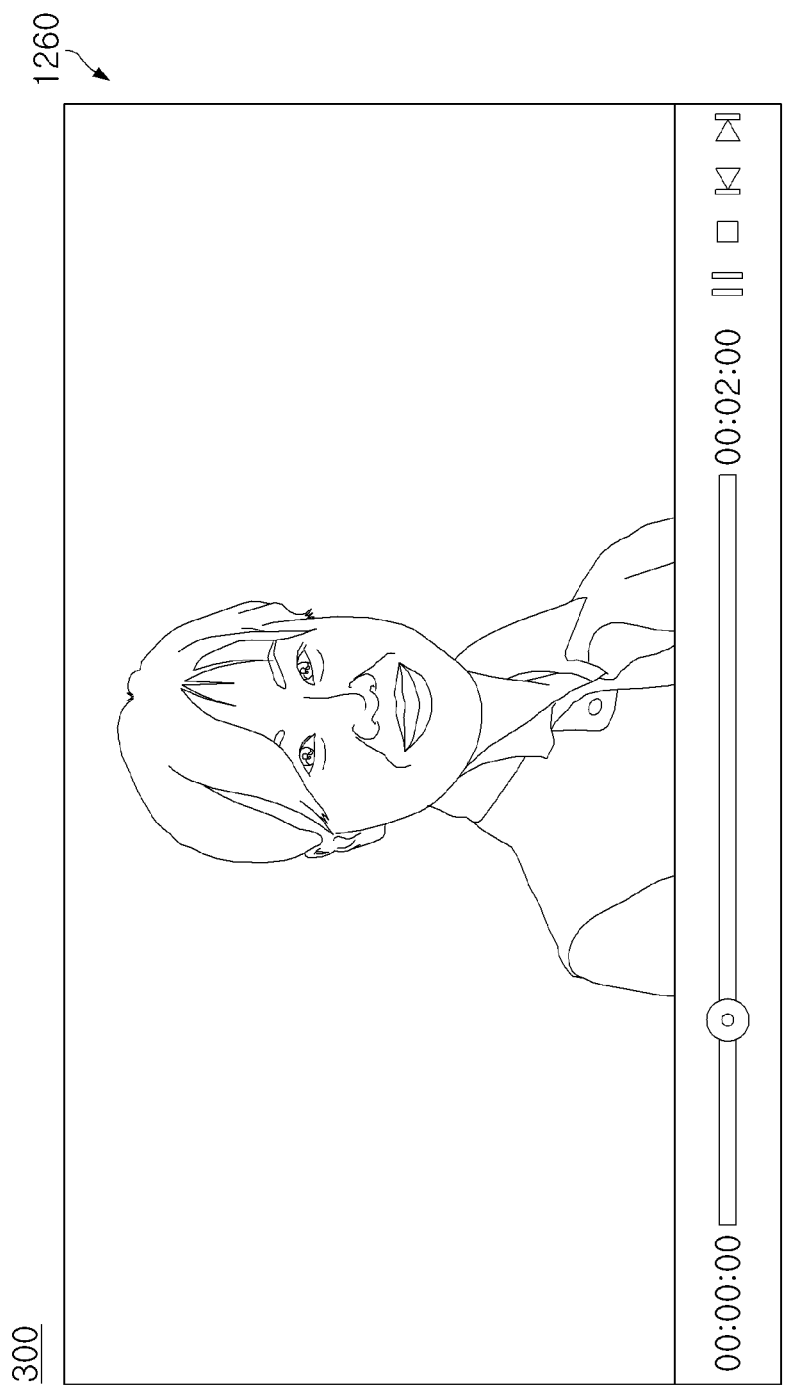

When the mode switch menu 1232 of the first menu area 1230 is selected, the user terminal 300 may switch the video slide mode to the video playback mode and may then play a playback section of the UGC video corresponding to a sound section of the current page. For example, as illustrated in FIG. 14, the user terminal 300 may display a video playback screen 1260 corresponding to the current page on the display unit.

When the search menu 1233 of the first menu area 1230 is selected, the user terminal 300 may display a search window (not shown) for searching for a subtitle or a tag on the display unit. When predetermined text information is input through the search window, the user terminal 300 may search for a page including subtitle or tag information corresponding to the text information and may display the page on the display unit.

Figure 15:
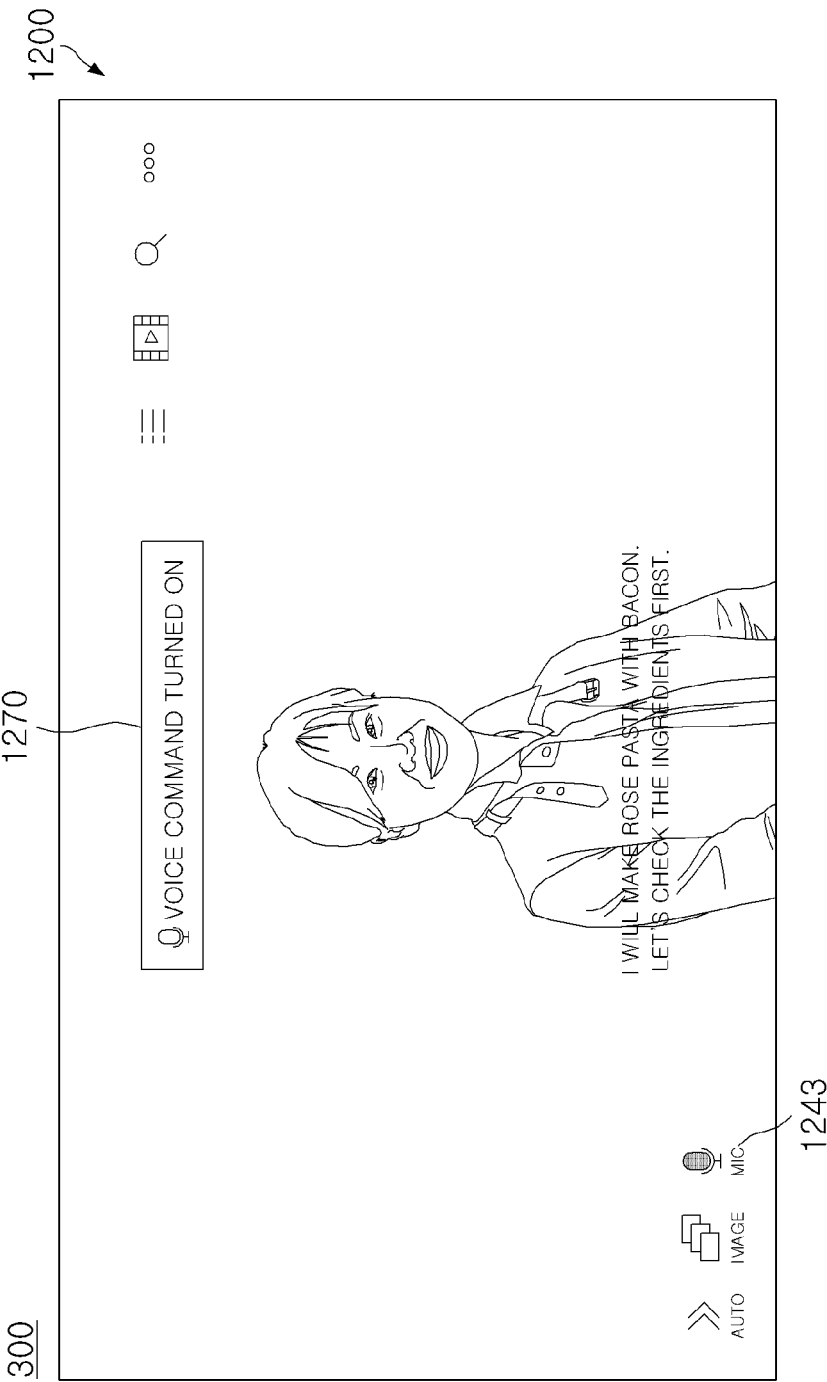

When the microphone menu 1243 of the second menu area 1240 is selected, the user terminal 300 may activate a microphone and may enter a sound recognition mode. When entering the sound recognition mode, the user terminal 300 may display notification information 1270 on the display unit as illustrated in FIG. 15. When a user's voice command is input through the microphone in the sound recognition mode, the user terminal 300 may execute a video slide operation corresponding to the voice command. Accordingly, the terminal user may conveniently use a video slide service in a situation where it is difficult to use a hand.

When a flicking input having a first directivity is received through the display unit included in the output unit 330 with the page screen 1200 displayed, the user terminal 300 may display the screen of the next page from the current page on the display unit. When a flicking input having a second directivity is received through the display unit, the user terminal 300 may display the screen of the previous page from the current page on the display unit. In this manner, the user terminal 300 may easily change the page screen through a predetermined gesture input. When the automatic switch menu 1241 of the second menu area 1240 is selected, the user terminal 300 may display the screen of the current page for a predetermined time and may then automatically change to the screen of the next page.

Figure 16:
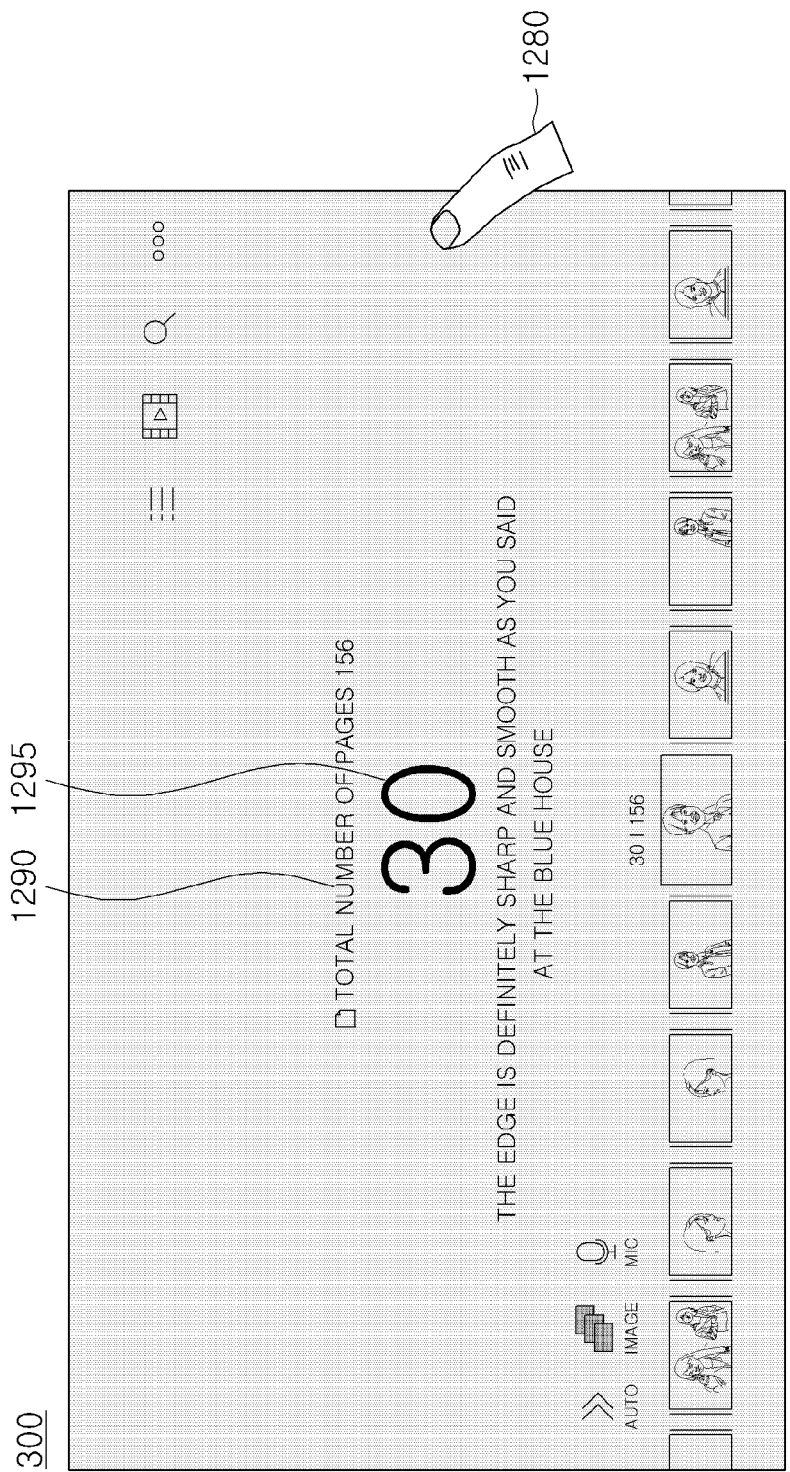

Further, the user terminal 300 may perform a high-speed search function in response to a predetermined gesture input. For example, as illustrated in FIG. 16, when a long touch input 1280 for a certain period of time is received on a right area of the page screen 1200, the user terminal 300 may change (switch or move) page screens related to the UGC video at a high speed. Here, the user terminal 300 may display information 1290 about the total number of pages and information 1295 about the number of page screens to be switched in one area of the display unit.

In addition, the user terminal 300 may divide a display area into a predetermined number of areas in response to a screen division request from the viewer (user) and may display a plurality of pages in the divided areas. Furthermore, the user terminal 300 may play or stop sound information corresponding to the current page in response to a playback/stop request from the viewer (user).

As described above, the user terminal 300 may interwork with the server 200 to provide the video slide service for viewing a UGC video in pages like a book.

A content providing server, a content providing terminal, and a content providing method according to embodiments of the disclosure may have the following effects.

According to at least one of embodiments of the disclosure, scene meta-information for each playback section may be generated using information extracted from a user-generated content (UGC) video and a video slide service may be provided based on the scene meta-information, thereby enabling a viewer (user) to watch the UGC video by pages like a book.

Further, according to at least one of embodiments of the disclosure, various operations associated with a video slide service may be controlled according to a viewer's (user's) voice command, thereby enabling the user to conveniently use the video slide service in a situation where it may be difficult to use by hand.

In addition, according to at least one of embodiments of the disclosure, only a playback section of a UGC video corresponding to a sound section of a video slide page may be played, thereby considerably reducing video viewing time as compared to a general video viewing mode.

The effects obtainable by a content providing server, a content providing terminal, and a content providing method according to embodiments of the disclosure are not limited to the effects mentioned above, and other effects not mentioned will be clearly understood by those skilled in the art from the following description.

The disclosure described above can be realized as a computer-readable code in a medium recording a program. A computer-readable medium may keep storing a computer-executable program or may temporarily store the computer-executable program for execution or download. Further, the medium may include various recording devices or storage devices in a form in which a single piece or a plurality of pieces of hardware is combined and may be distributed on a network without being limited to a medium directly connected to a computer system. Examples of the medium may include those configured to store a program instruction including a magnetic medium, such as a hard disk, a floppy disk, and a magnetic tape, an optical recording medium, such as a CD-ROM and a DVD, a magneto-optical medium, such as a floptical disk, a ROM, a RAM, a flash memory, and the like. In addition, other examples of the medium may include an app store that distributes applications, a site that supplies or distributes various types of software, and a recording medium or a storage medium managed by a server. Therefore, the above detailed description should not be construed as restrictive in all aspects and should be considered as illustrative. The scope of the disclosure should be determined based on reasonable interpretation of the appended claims, and all changes and modifications within the equivalent scope of the disclosure are included in the scope of the disclosure.

What is claimed is:

1. An operating method of a user terminal comprising:
    uploading a user-generated content (UGC) video to a server, the UGC video comprising a plurality of playback sections;
    receiving scene meta-information for each of said playback sections corresponding to the UGC video from the server;
    automatically generating, by a processor, a video slide file based on the received scene meta-information for each of said playback sections, the video slide file comprising a plurality of pages corresponding to the plurality of playback sections, wherein each of said pages includes a representative image, where the representative image is associated with an image frame selected from among a plurality of image frames within an associated one of said playback sections, and further wherein each of said playback sections within the UGC video has a representative image associated therewith;
    displaying an item corresponding to the video slide file on a display unit of the user terminal; and
    displaying a page screen on the display unit comprising a representative image and subtitle information for one of said playback sections of the UGC video in response to a user selection on the item.

2. The operating method as claimed in claim 1, wherein each of said pages is generated based on the scene meta-information for each of said playback sections of the UGC video.

3. The operating method as claimed in claim 1, wherein the subtitle information is generated by performing sound recognition on audio information extracted from the UGC video.

4. The operating method as claimed in claim 1, wherein the item is displayed as a thumbnail image.

5. The operating method as claimed in claim 1, wherein the scene meta-information for each of said playback sections comprises time code information, representative image information, and subtitle information.

6. The operating method as claimed in claim 1, wherein the scene meta-information for each of said playback sections is received from the server as a streaming method.

7. The operating method as claimed in claim 1, wherein the receiving of the scene meta-information comprises:
    receiving first scene meta-information comprising time code information and representative image information for each of said playback sections corresponding to the UGC video; and
    receiving second scene meta-information comprising subtitle information for each of said playback sections corresponding to the UGC video.

8. The operating method as claimed in claim 1, further comprising displaying a first pop-up window for sharing the video slide file in response to a user selection on a share menu.

9. The operating method as claimed in claim 1, further comprising performing a video slide operation corresponding to a user's voice command in a sound recognition mode.

10. The operating method as claimed in claim 1, further comprising changing the page screen of the UGC video at a predetermined speed in response to a predetermined gesture input.

11. The operating method as claimed in claim 1, further comprising playing the UGC video corresponding to a sound section of the page screen in response to a user selection on a mode switch menu.

12. The operating method as claimed in claim 1, further comprising displaying a scroll area comprising a plurality of thumbnail images corresponding to previous pages and next pages of a current page in response to a user selection on a preview menu.

13. The operating method as claimed in claim 1, wherein the uploading further comprises displaying a second pop-up window for selecting an upload method of the UGC video in response to a user selection on an upload menu.

14. The operating method as claimed in claim 13, wherein the second pop-up window comprises a first menu for uploading a UGC video stored in a memory and a second menu for uploading a UGC video captured in real time by a camera.

15. The operating method as claimed in claim 1, further comprising displaying notification information indicating a process of converting the UGC video into the video slide file.

16. The operating method as claimed in claim 1, further comprising outputting sound information corresponding to a corresponding page when the page screen is displayed.

17. The operating method as claimed in claim 1, further comprising:
    displaying an app icon corresponding to a video slide application; and
    displaying a predefined user interface screen in response to a user selection on the app icon.

18. The operating method as claimed in claim 17, wherein the user interface screen comprises a file list area comprising thumbnail images corresponding to video slide files and a menu area comprising menus related to the video slide application.

19. A non-transitory computer-readable recording medium storing a computer program for instructing a computer to execute the method described in claim 1.

20. A user terminal comprising:
- a communication unit configured to provide a communication interface with a server;
- a display unit configured to display a predefined user interface; and
- a controller configured to:
  - upload a user-generated content (UGC) video to the server using an upload menu included in the user interface, the UGC video comprising a plurality of playback sections,
  - automatically generate, by the controller, a video slide file based on scene meta-information for each of said playback sections corresponding to the UGC video upon receiving the scene meta-information for each of said playback sections from the server, the video slide file comprising a plurality of pages corresponding to the plurality of playback sections, wherein each of said pages includes a representative image, where the representative image is associated with an image frame selected from among a plurality of image frames within an associated one of said playback sections, and further wherein each of said playback sections within the UGC video has a representative image associated therewith,
  - display an item corresponding to the video slide file on the display unit, and
  - display a page screen on the display unit comprising a representative image and subtitle information for one of said playback sections of the UGC video in response to a user selection to the item.

21. The operating method as claimed in claim 1, wherein the representative image selected from among a plurality of image frames is the foremost image frame of said associated playback section.

22. The operating method as claimed in claim 1, wherein the representative image selected from among a plurality of image frames is the middle image frame of said associated playback section.

23. The operating method as claimed in claim 1, wherein the representative image selected from among a plurality of image frames is the last image frame of said associated playback section.

24. The operating method as claimed in claim 1, wherein the representative image selected from among a plurality of image frames is the image frame of said associated playback section most similar to subtitle information of said associated playback section.

25. The operating method as claimed in claim 1, further comprising:
- displaying a mode switch menu on the display unit, wherein the mode switch menu is configured and arranged to allow the user to switch between a slide mode in which an individual one of the representative images is shown on the display unit and a video playback mode in which the image frames of the associated playback section are sequentially shown on the display unit.

26. The operating method as claimed in claim 1, further comprising:
- displaying an automatic switch menu on the display unit, wherein the automatic switch menu is configured and arranged to display on the display unit, in sequence, a first one of said representative images and the associated subtitle information followed by a second one of said representative images and the associated subtitle information.

* * * * *